United States Patent
Argoudelis et al.

[15] 3,671,647
[45] June 20, 1972

[54] LINCOMYCIN 3-NUCLEOTIDES AND THE SALTS THEREOF

[72] Inventors: Alexander D. Argoudelis; John H. Coats, both of Kalamazoo, Mich.

[73] Assignee: The Upjohn Company, Kalamazoo, Mich.

[22] Filed: March 24, 1971

[21] Appl. No.: 127,852

Related U.S. Application Data

[63] Continuation-in-part of Ser. No. 30,254, April 20, 1970, abandoned.

[52] U.S. Cl. ..........................260/210 R, 195/80, 424/180
[51] Int. Cl. .........................................................C07c 47/18
[58] Field of Search ...........................................260/210 R

[56] References Cited

UNITED STATES PATENTS 3,487,068 12/1969 Morozowich ..................260/210 R
3,544,552 12/1970 Argoudelis et al. ............260/210 R

*Primary Examiner*—Lewis Gotts
*Assistant Examiner*—Johnnie R. Brown
*Attorney*—Roman Saliwanchik and John Kekich

[57] ABSTRACT

This invention relates to novel antibacterial compounds and to processes for preparing them. It is particularly directed to novel 3-nucleotides of lincomycin, and of analogs thereof, and of celesticetins. The compounds of the invention can be shown by the following formula:

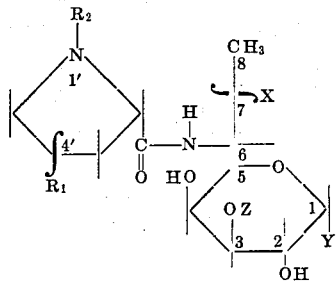

wherein Y is —SR wherein R is alkyl of one to six carbon atoms, inclusive,

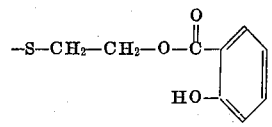

, or —S—$CH_2$—$CH_2$—OH, $R_1$ is H, or cis or trans lower-alkyl of from one to eight carbon atoms, inclusive; $R_2$ is H, $CH_3$, or $C_2H_5$; X is OH, chlorine, bromine, iodine or —$OR_3$ wherein $R_3$ is alkyl of one to six carbon atoms, inclusive, each in the (R) or (S) configuration; and Z is a nucleoside —5'— phosphate group wherein said nucleoside can be adenosine, guanosine, cytidine or uridine; and salts thereof.

Examples of alkyl of from one to eight carbon atoms are methyl, ethyl, propyl, butyl, pentyl, hexyl, heptyl, and octyl and isomers thereof.

19 Claims, No Drawings

LINCOMYCIN 3-NUCLEOTIDES AND THE SALTS THEREOF

CROSS REFERENCE TO RELATED APPLICATION

This application is a continuation-in-part of co-pending application Ser. No. 30,254, filed Apr. 20, 1970 now abandoned.

BRIEF SUMMARY OF THE INVENTION

The novel compounds of the invention are prepared by incorporating a compound, as defined in Formula I, wherein Z at the 3-position of the molecule is hydrogen (hereinafter referred to as the "parent" compound), in a Streptomyces fermentation, and transforming the compound into a novel 3-nucleotide, as described above. Also produced in varying amounts in the process of the subject invention, are 3-phosphate esters of the parent compounds. These 3-phosphate esters are readily distinguished from the 3-nucleotides of the subject invention since the 3-phosphates do not have an ultraviolet absorption maximum and they are not hydrolyzed to the parent compound by snake venom diesterase (venom phosphodiesterase) or spleen diesterase. Thus, as will be described in detail hereinafter, the 3-nucleotides are detected in the recovery procedures of the subject invention by ultraviolet analysis and the snake venom diesterase test. Venom diesterase, cleaves, for example, clindamycin-adenylate, to clindamycin and adenosine-5'-phosphate.

Initial presence of 3-nucleotides in fermentation beers is detected by the use of an alkaline phosphatase test, as hereinafter described. However, this test does not differentiate between 3-phosphates and 3-nucleotides and the 3-nucleotides would remain unrecognized but for the use of other tests, as described above.

The compounds of the invention, though antibacterially inactive in vitro against $S.$ $aureus$ and $Sarcina$ $lutea$, are activated when used in vivo, for example against $S.$ $aureus$. Presumably, this activation in vivo is comparable to the generation of the parent lincomycin compound when contacting the 3-nucleotide-1incomycin compound with alkaline phosphatase in vitro.

DETAILED DESCRIPTION

The lincomycin compounds, herein defined as starting materials or parent compounds, can be prepared by procedures disclosed in various patents, publications and patent applications. These are as follows:

| | |
|---|---|
| Lincomycin | U.S. Pat. No. 3,086,912 |
| With reference to Formula I, wherein | |
| Y = —SCH$_3$ to —SC$_6$H$_{13}$ | U.S. Pat. No. 3,380,992 |
| R$_1$ = cis or trans alkyl to 8 carbon atoms | U.S. Pat. No. 3,380,992 |
| R$_2$ = Hydrogen or alkyl to 8 carbon atoms | U.S. Pat. No. 3,380,992 |
| X = (S)OH or OR$_3$ | U.S. Pat. No. 3,380,992 |
| X = (R) or | Belgium Pat. No. 676,202 |
| (S) Cl or Br | U.S. Pat. No. 3,496,163 |
| X = (R) or (S)I | U.S. Pat. No. 3,496,163 |
| Celesticetin | U.S. Pat. No. 2,928,844 |
| Desalicetin | U.S. Pat. No. 2,851,463 |

4'-Depropyl-4'-ethyl lincomycin, wherein Y is —SCH$_3$, R$_1$ is trans ethyl, R$_2$ is CH$_3$, and X is (R)OH in Formula I can be prepared by the procedure disclosed in Examples 1 and 2 of U.S. Pat. No. 3,359,164 wherein said compound is named lincomycin B.

1'-Demethyl-1'-ethyl lincomycin, wherein Y is —SCH$_3$, R$_1$ is trans n-propyl, R$_2$ is ethyl, and X is (R)OH in Formula 1 can be prepared by the procedure disclosed in Examples 1 and 2 of U.S. Pat. No. 3,359,163 wherein said compound is named lincomycin C.

1'-Demethyl lincomycin, wherein Y is —SCH$_2$, R$_1$ is trans n-propyl, R$_2$ is H and X is (R)OH in Formula 1 can be prepared by the procedure disclosed in Example 1 of U.S. Pat. No. 3,329,568 wherein said compound is named lincomycin D.

Of the above compounds, the compound 7(S)-chloro-7-deoxylincomycin is also presently known by the generic name "clindamycin."

The parent lincomycin compounds or analogs thereof, and celesticetin, as described above, can be converted to 3 nucleotides, as shown in Formula I, by incorporating the parent compound in a Streptomyces fermentation. For example, upon adding clindamycin hydrochloride to a $Streptomyces$ $coelicolor$ Müller, NRRL 3532, fermentation there are produced clindamycin nucleotides.

The fermentation to make the novel compounds of the invention can be conducted in an aqueous nutrient medium under submerged aerobic conditions. It is to be understood also that for the preparation of limited amounts of 3-nucleotides, surface cultures and bottles can be employed. The organism used in the fermentation is grown in a nutrient medium containing a carbon source, for example, an assimilable carbohydrate and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with mil solids, soybean meal, cottonseed meal, cornmeal, milk solids, pancreatic digest of casein, distillers, solubles, animal peptone liquors, meat and bone scraps, and the like. Combinations of these carbons and nitrogen sources can be used advantageously. Trace metals, for example, zinc, magnesium, manganese, cobalt, iron and the like need not be added to the fermentation media since tap water and unpurified ingredients are used as media components.

Production of the novel compounds of the invention can be effected at any temperature conducive to satisfactory growth of the Streptomyces culture, for example, between about 18° and 40° C., and preferably between about 20°and 37°C.

When a Streptomyces fermentation, as described above, is used to prepare nucleotides of lincomycin or an analog thereof, as herein defined, or of celesticetin, the lincomycin or celesticetin parent compound (non-nucleotide) can be added prior to inoculation of the fermentation medium. Alternatively, the parent compound can be added in small increments during the fermentation cycle so long as the addition is not too late in the fermentation cycle to accomplish the desired transformation of all the parent compound added. The time and amounts of addition of the parent compound can easily be determined for each fermentation by adding the parent compound until some toxicity to the fermentation is observed, such as inhibition of the formation of 3-nucleotides. Also, if at the end of the fermentation cycle there remains parent compound, then in subsequent fermentations smaller levels of parent compound should be used and/or the time of addition should be altered.

Since the in vitro antibacterial activity against $S.$ $lutea$ of the parent compound is lost upon transformation to a 3-nucleotide, the presence of residual in vitro antibacterial activity in a culture or culture extract at 24 hours after addition of the parent compound is evidence that the capacity of the culture or culture extract to transform the parent compound has been exceeded or the level or added compound was too high and inhibited the microorganism in the transformation process. The in vitro antibacterial activity, mentioned above, can be ascertained on a standard microbiological plate assay against the microorganism $Sarcina$ $lutea$.

A variety of procedures can be employed in the isolation and purification of the novel compounds in the subject invention, for example, solvent extraction, liquid-liquid distribution in a Craig apparatus, liquid ion exchange extraction or adsorption on a suitable adsorbent, for example, carbon, and column chromatography. In a preferred recovery process, the novel 3-nucleotide compounds are isolated from a fermentation beer, as herein described, by filtration. The filtrate is then passed over a suitable absorbent, for example, activated carbon or Amberlite XAD-2 (a non-ionic, macro-porous copolymer of styrene cross-linked with divinylbenzene resin sold by Rohm and Haas Company). This resin is prepared by suspension polymerization of styrene divinylbenzene copolymers in the presence of a substance which is a good solvent for the copolymer (see J.A.C.S. 84, 306,1962) to remove water-soluble impurities which may interfere with the subsequent chromatography step. The resin is eluted with a mixture of water and water-miscible organic solvents, for example, water-lower alcohols, water-lower ketones, and the like. The eluate from the carbon or Amberlite XAD–2 resin is then passed through a chromatography column containing an anion exchange resin, for example, Dowex-1 (X- 4) in the acetate form (sold by Dow Chemical Company, Midland, Michigan). Fractions are collected from the chromatography column and assayed for activity against the microorganism *S.lutea* before and after treatment of the fractions with alkaline phosphatase as hereinafter described. Fractions having the highest activity against *S. lutea* upon test with alkaline phosphatase are pooled, concentrated, then subjected too countercurrent distribution in a Craig apparatus using a solvent system consisting of n-butanol-water (1:1 v/v). Fractions showing maximum ultraviolet absorption, and which are hydrolyzed by snake venom phosphodiesterase, are collected to give a preparation containing a mixture of 3-nucleotides. This mixture can be subjected to separation procedures to recover the individual 3-nucleotides.

A preferred separation procedure to recover the individual 3-nucleotides from a mixture thereof utilizes DEAE-Sephadex (Pharmacia Fine Chemicals, Inc., Piscataway, N.J., U.S.A. or Pharmacia, Uppsalu, Sweden) column chromatography. The column is eluted with tris-(hydroxymethyl)-amino-methane (THAM) acetate. Fractions are analyzed by testing for activity against *S lutea* before and after alkaline phosphatase treatment and by the ultraviolet spectrum analysis at the original pH of the fraction, and at an acid pH (ca. 2.0). Pools of fractions having biological activity against *S lutea* after alkaline phosphatase treatment, and showing ultraviolet spectrum absorption, are made. Each pool contains a single 3-nucleotide, along with other undesired materials. The THAM-acetate buffer is removed from these pools by passing them over a column containing Amberlite XAD-2 packed in water. After washing the column with water, it is eluted with aqueous methanol (ca. 80 percent aqueous methanol). Fractions, about 20 ml. each, are collected and analyzed by U.V. Fractions showing U.V. absorption are combined and concentrated to dryness to a residue. The residue is dissolved in a lower alcohol, for example methanol, and the solution mixed with ether to yield a precipitate of a 3-nucleotide compound, as defined in Formula I. As shown in Formula I, the 3-nucleotide moiety of the novel compounds of the invention are the 3-(5'-cytidylate), 3-(5'- adenylate), 3-(5'-uridylate), and 3-(5'-guanylate).

The nucleotides can also be separated by partition chromatography over Dicalite (diatomaceous earth) using solvent systems consisting of water and a water-immiscible solvent.

Lincomycin 3-nucleotides and the 3-nucleotides of lincomycin analogues are essentially inactive against bacteria in vitro. Thus, these novel 3-nucleotide compounds are detected by testing for bioactivity against *S. lutea* after treatment of the samples with alkaline phosphatase. For example, the reaction mixture consists of 0.5 ml. Tris buffer (0.5 M) pH 8.0,0.5 ml. alkaline phosphatase (1 mg./ml.) stock made up in Tris buffer (0.5 M) pH 8.0, 0.05 ml. (about 50 mcg.) of lincomycin-3-nucleotides. This reaction mixture is incubated overnight at 28°C.

Illustrative of Streptomyces which can be used to prepare the novel compounds of the invention are *S. coelicolor* 1945, NRRL 3531; *S. coelicolor* Müller, NRRL 3532; and *S. venezuelae*, NRRL 3527. These cultures are available, without restriction, from the Northern Utilization and Research Division, Agricultural Research Service, U.S. Department of Agriculture, Peoria, Illinois, U.S.A.

The novel compounds of the invention are amphoteric compounds and can exist in different ionic forms according to the pH of the environment. At low pH the compounds exist in the acid-addition salt form, at a higher pH in a zwitterion form, and at a still higher pH in a metal salt form. The acid-addition salts include those of strong organic or inorganic acids having a pK equal to or less than that of phosphate, for example, hydrochloric, sulfuric, phosphoric, and like acids.

Acid and metal salts include the alkaline metal (Na and K as well as including ammonia) and alkaline earth metal (including calcium, magnesium, zinc and aluminum) salts obtained by neutralizing an acid form with the appropriate base, for example, ammonium hydroxide, sodium and potassium hydroxides, or alkoxides, calcium, or magnesium hydroxides, and the like. The acid and neutral salts also include amine salts obtained by neutralizing an acid form with a basic amine, for example, mono-, di-, and trimethylamines, mono-, di-, and triethylamines, mono-, di-, and tripropylamines (iso- and normal), ethyldimethylamine, benzyldiethylamine, cyclohexylamine, benzylamine, dibenzylamine, N,N'-dibenzylethylenediamine, bis-(ortho-methoxyphenylisopropyl)amine, and like lower-aliphatic, lower-cycloaliphatic, and lower-araliphatic amines, the lower-aliphatic and lower-cycloaliphatic radicals containing up to and including eight carbon atoms; heterocyclic amines such as piperidine, morpholine, pyrrolidine, piperazine, and the lower-alkyl derivatives wherein lower alkyl contains 1 and 8 carbon atoms, inclusive thereof such as 1-methylpiperidine, 4-ethylmorpholine, 1-isopropylpyrrolidine, 1,4-dimethylpiperazine, 1-n-butylpiperidine, 2-methylpiperidine and 1ethyl-2-methylpiperidine; amines containing water solubilizing or hydrophilic groups such as mono , di-, and triethanolamines, ethyldiethanolamine, n-butyl monoethanolamine, 2-amino-1butanol, 2-amino-2-ethyl-1,3-propanediol, 2-amino-2-methyl-1-propanol, tris(hydroxymethyl)-aminomethane, phenylmonethanolamine, p-tertiary-amylphenyldiethanolamine, and galactamine, N-methylglucamine, N-methylglucosamine, ephedrine, phenylephrine, epinephrine, and procaine; tetraethylammonium hydroxide; and guanidine. The various forms can be used interchangeably but for most purposes the zwitterion form

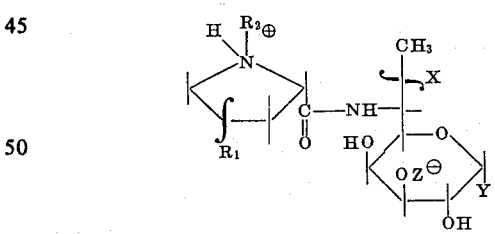

wherein $R_1$, $R_2$, X, Y and Z are as defined previously, and the ammonium salt form are preferred.

Further, the invention relates to a process for the therapeutic treatment of humans and animals hosting susceptible microbial disease-producing organisms (bacterial and other microparasites) and the prophylactic treatment of a disease-susceptible host comprising the administration of the 3-nucleo-tide esters or a pharmacologically acceptable salt to the host.

The compositions of the present invention are useful in the same manner as lincomycin and celesticetin in the treatment of humans, birds, and animals for various pathological conditions. The compositions provide a means for administering the therapeutic ingredient by the oral and parenteral routes for systemic treatment. The compositions provide a method of therapy for tonsillitis, pneumonia, otitis, conjunctivitis, boils, carbuncles and other infectious conditions of humans due to the presence of bacteria. In animals, the compositions can be used prophylactically. For example, rats can be protected from *Streptococcus viridans* during shipment. Animals raised for meat can be given prophylactic treatment for increased weight gain.

Mammals hosting a parasitic protozoan of the class Sporazoa, order Coccidia ( a microparasite producing the disease coccidiousis) can be treated by administration of the compositions of the present invention. For example cattle infected with *E. zurnii, E. bovis, E. illipsordalis;* sheep and goats with *E. parva, E. fourei;* swine with *E. debliecki, E. scabra,* and *Isospora suic;* dogs and cats with *Isospora biqemina, Isospora felis, E. canis, E. felini;* poultry with *E. tenella;* rabbits with *E, steedae, E, perforans;* and mink with *E. mustelae* can be treated.

The compositions are also useful in the treatment of diseases caused by members of the genus Mycoplasma, the most commonly known forms are PPLO (pleuropneumonia-like organisms) such as *M. hominis, M. salivarium, M. mycoides, M. hyopneumonia, M. hyorhinis, M. gallisepticum, M. arthriditis* and other species in man and animals, including domestic animals such as sheep, dogs, cattle, swine, and poultry (e.g., chickens, turkeys, ducks, and geese) and laboratory animals (e.g., rats and mice).

The compositions find application in the treatment of kidney and other infections when L forms of gram-negative and gram-positive bacteria are present, for example, L forms of *P. mirabilis*.

The 3-nucleotides and salts disclosed herein are presented for oral and parenteral administration in solid and liquid unit dosage forms, such as tablets, capsules, powders, granules, pills, sterile parenteral solutions and suspensions, and oral solutions and suspensions, and oil-water emulsions.

Powders are prepared by comminuting the 3-nucleotides to a suitably fine size and mixing with a similarly comminuted diluent. The diluent can be edible carbohydrate material such as starch or lactose. Advantageously, a sweetening agent or sugar is present as well as a flavoring material. Dry granulations for reconstitution with water are prepared utilizing water-soluble diluents. A powder mixture of a finely divided 3-nucleotide and a water-soluble diluent such as sucrose, glucose, and the like, is wetted with a binder such as acacia mucilage or gelatin solution and forced through a screen to form granules which are allowed to dry. Advantageously, a thickening or suspending agent such as methylcellulose is present as well as a wetting agent and flavoring oil.

Capsules are produced by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, wet granulating or dry granulating or slugging, adding a lubricant, and pressing into tablets. The powder mixture is prepared by mixing the 3-nucleotide suitably comminuted, with a diluent or base such as starch, lactose, kaolin, dicalcium phosphate and the like. The powder mixture can be granulated by wetting with a binder such as corn syrup, gelatin solution, methylcellulose solution or acacia mucilage and forcing through a screen. As an alternative granulating procedure, the powder mixture can be slugged, i.e., run through the tablet machine and the resulting large tablets (slugs) broken into granules. The granules can be lubricated to prevent sticking to the tablet-forming dies by means of the addition of stearic acid, a stearate salt, talc, or mineral oil. The lubricated mixture is then compressed into tablets. Advantageously, the tablet can be provided with a protective coating consisting of a sealing coat of shellac, a coating of sugar and methylcellulose, and a polish coating of carnauba wax.

Oral fluids are prepared in unit dosage forms such as syrups and elixirs wherein each teaspoonful of composition contains a predetermined amount of the 3-nucleotide for administration.

A syrup is prepared by dispersing the 3-nucleotide in a suitable flavored aqueous sucrose solution. Similarly, an elixir is prepared utilizing a hydro-alcoholic vehicle. Elixirs are advantageous vehicles for use when a solution is desired of a compound showing low solubility in water and good solubility in an aqueous-alcoholic medium.

For parenteral administration, sterile fluid unit dosage forms can be prepared. In preparing the parenteral form, a measured amount of the 3-nucleotide is placed in a vial; the vial and its contents sterilized and sealed. An accompanying vial of sterile water can be conveniently provided as a vehicle to form a suspension or solution (depending on water-solubility of compound) prior to administration. Advantageously, the sterile water can have dissolved therein a suspending agent, local anesthetic, and buffering agents.

Alternatively, a parenteral suspension having prolonged action can be prepared by suspending the 3-nucleotide in a parenterally acceptable vegetable oil with or without additional adjuvants.

The term "unit dosage form" as used in the specification and claims refers to physically discrete units suitable as unitary dosages for human subjects, each unit containing a predetermined quantity of active material calculated to the desired dosage in association with the required pharmaceutical diluent, carrier, or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use as disclosed in detail in this specification, these being features of the present invention. Examples of suitable unit dosage forms in accord with this invention are tablets, capsules, powder packets, granules, wafers, teaspoonfuls, tablespoonfuls, dropperfuls, ampuls, vials, segregated multiples of any of the foregoing, and other forms as herein described. The unit dosage forms compounded with a suitable pharmaceutical carrier contain, in the preferred embodiment, from 25 mg. to 500 mg. of 3-nucleotide or its pharmacologically acceptable salts per dosage unit and 5 to 65 percent w/v for parenteral preparations.

The amount of 3-nucleotide or salts thereof that is to be administered depends on the age and weight of the patient, the particular condition to be treated, and the route of administration. A dose of from about 1 mg./kg./day to about 50 mg./kg./day is preferred for systemic treatment.

The following examples are illustrative of the process and products of the present invention, but are not to be construed as limiting. All percentages are by weight and all solvent mixture proportions are by volume unless otherwise noted.

EXAMPLE 1 — CLINDAMYCIN-3-NUCLEOTIDES

A. Fermentation

A soil stock of *Streptomyces coelicolor* Müller, NRRL 3532, is used to inoculate a series of 500-ml. Erlenmeyer flasks, each containing 100 ml. of sterile seed medium consisting of the following ingredients:

| | |
|---|---|
| Glucose monohydrate | 25 g./liter |
| Pharmamedia* | 25 g./liter |
| Tap water q.s. | Balance |

*Pharmamedia is an industrial grade of cotton-seed flour produced by Trader's Oil Mill Company, Fort Worth, Texas.

The shake flasks are grown for 3 days at 28° C. on a rotary shaker.

Seed inoculum (5 ml. ) prepared as described above, is used to inoculate each of a series of 500-ml. Erlenmeyer flasks each containing 100 ml. of sterile fermentation medium consisting of the following ingredients;

| | |
|---|---|
| Yeast Extract | 2.5 g./liter |
| NZ amine B* | 5.0 g./liter |

| | |
|---|---|
| Glucose monohydrate | 20.0 g./liter |
| Sodium nitrate | 3.0 g./liter |
| Dipotassium phosphate | 1.0 g./liter |
| Magnesium sulphate | 0.5 g./liter |
| Potassium chloride | 0.5 g./liter |
| Ferrous sulphate | 0.01 g./liter |
| Tap water | Balance |

*Sold by Difco Laboratories, Detroit, Michigan. It is a bulk peptone in powder form obtained by the pancreatic digestion of casein.

100 mg/liter clindamycin hydrochloride is added to the fermentation flask broth 24 hours after inoculation.

The fermentation flasks are grown for 24 hours at 28° C. on a rotary shaker. The transformation reaction in the fermentation flask is followed by measuring the loss of clindamycin activity using an *S. lutea* standard curve assay. Approximately 100 percent of the added cylindamycin is transformed to an in vitro antibacterially inactive form in about 24 hours. The *S. lutea* assay is conducted as follows: The assay is an agar buffered to pH 6–8 with pH 7.0 phosphate buffer (0.1 M). A unit volume (0.08 ml.) of solution containing the material to be assayed is placed on a 12.7 mm. assay disc which is then placed on an agar plate seeded with the assay microorganism. The tray is incubated at 37° C. for 18–24 hours. In vitro antibacterial activity is evidenced by a zone of grown inhibition surrounding the disc. Antibacterial activity can be expressed quantitatively as mcg. parent compound (or as lincomycin or clindamycin) /ml. by the linear relation of log dose to zone diameter, referred to the standard, according to the art. Presence of clyindamycin-3-nucleotides is determined by first incubating the inactive beer with alkaline phosphatase at pH 8.0 in Tris buffer, and then assaying the reaction mixture against *S. lutea*, as described above.

B. Recovery

1. Filtration and Absorption on Non-Ionic Resin

The above fermentation is scaled up into a fermentation tank to produce 490 liters of fermentation beer containing clindamycin-3-nucleotides. The clindamycin-3-nucleotides are recovered from the whole beer by first filtering the whole beer with the aid of 10 kg. diatomaceous filter aid. The filter cake is washed with water. The aqueous wash is combined with the clear beer and the combined clear beer-wash is treated with an adsorbent, for example carbon or Amberlite AXD-2 (sold by Rohm and Haas Company), in order to remove water-soluble impurities which tend to reduce the efficiency of subsequent chromatography. The absorption column is prepared by slurrying about 22 kg. of adsorbent (Amberlite XAD-2) in water, pouring the slurry into a glass column (2 inches inside diameter), allowing the slurry to settle under atmospheric pressure, and draining. The clear beer-wash, described above, is passed through the column at a flow rate of about 1 liter per minute. The column is washed with water; 100 liters of the water wash is discarded. The column is then eluted with 120 liters of 60 percent aqueous methanol (Eluate I) and 100 liters of 95 percent aqueous methanol (Eluate II). Eluate I is treated further to recover clyindamycin-3-nucleotides, whereas Eluate II is discarded.

2. Absorption on Ion Exchange Resin

Eluate I, described above, is chromatographed over an anion exchange chromatographic column. The column is filled with 22 Kg. Dowex-1 (X-4) in the acetate form, supplied by Dow Chemical Company, Midland, Michigan. Eluate I is adjusted to a pH of 10.0 with concentrated ammonium hydroxide and the alkaline solution is passed through the chromatography column. The spent liquid from the column is concentrated to dryness; yield, 877 grams of material containing clindamycin-3-nucleotides. This material is labeled "-Material A." The column is then washed with 100 liters of water and eluted with 70 liters of 5 percent aqueous acetic acid. The acetic acid elutes are concentrated and the resulting concentrate is freeze-dried; yield 89.4 grams of material containing clindamycin-3-nucleotides. This material is labeled "-Material B."

C. Purification

1. Absorption on Non-Ionic Resin

A major portion (776 g.) of "Material A," obtained as described above, is dissolved in 1.5 liters of water. The pH of the solution is adjusted to 7.5 with concentrated ammonium hydroxide and this solution is passed over a column containing 2 liters of Amberlite XAD-2 resin. The column is washed with 6 liters of water. The aqueous wash is collected in three 2-liter fractions (W-1, W-2, W-3). The column is then eluted with 90 percent aqueous methanol. Fractions of 20 ml. are collected and tested for activity against *S. lutea* before and after treatment with alkaline phosphatase. Fractions numbered 61–250 are combined and concentrated to dryness; yield, 52 g. of material containing cylindamycin-3-nucleotides. This material is labeled "ADA-10.1."

Fractions W-2 and W-3, described above, and fractions numbered 1–60 from the above Amberlite XAD-2 column, are combined and passed again over the same Amberlite XAD-2 column, which is first regenerated with 15 liters of water (W-1 obtained as described above) and then eluted with 4 liters of absolute methanol. Three cuts are made, i.e. methanol fraction 1 = 1 liter; methanol fraction 2 = 1 liter; and, methanol fraction 3 = 3 liters. These fractions are tested for activity against *S. lutea* before and after treatment with alkaline phosphatase. Methanol fraction 2 is concentrated to dryness; yield, 12.63 g. of material containing clindamycin-3-nucleotides. This preparation is labeled "ADA-11.1."

Methanol fraction 3 is concentrated to dryness; yield, 0.7 g. of material containing clindamycin-3-nucleotides. This preparation is labeled "ADA-11.2."

Preparations ADA-10.1 ADA-11.1, and ADA-11.2, all prepared as described above, are combined as preparation ADA-37.1 (64.7 g.). This preparation containing clindamycin-3-nucleotides is purified further by counter double current distribution as described below.

2. Counter Double Current Distribution

A portion (21 g.) of preparation ADA-37.1, described above, is dissolved in 100 ml. of upper and 100 ml. of the lower phase of a solvent system consisting of n-butanol-water (1:1 v/v). The solution is added in the center tubes of an all-glass counter double current distribution apparatus (CDCD) (100 tubes). After 48 transfers, both the upper and lower phase are collected in 50 ml. fractions. A total of 100 transfers are run. The collected fractions and the material in the CDCD tubes are analyzed for *S. lutea* activity before and after treatment with alkaline phosphatase.

Using the same conditions as above, two additional CDCD distributions are run, each using 21 g. of preparation ADA-37.1.

In each of the above three distributions the following pools of fractions are made:

| | | |
|---|---|---|
| Pool I | Lower-phase collector—Fractions number 20–50. | |
| Pool II | Lower and upper-phase remaining in the CDCD machine. | |
| Pool III | Upper-phase collector—Fractions numbered 5–35. | |

Pool I from all three distributions are concentrated to dryness. The resulting residue is dissolved in absolute methanol and this solution is mixed with ether. The resulting precipitate is isolated by filtration and dried; yield, 7.12 g. This preparation is not pursued further.

Pools II and III from all three distributions are treated as above for Pool I; yield, 13.6 g. of material from Pool II labeled "ADA-39.2," and 0.49 g. of material from Pool 111 labeled "ADA-39.3." Preparations ADA-39.2 and ADA-39.3 consist of essentially pure clindamycin-3-nucleotides as evidenced by inactivity against *S. lutea* before treatment with alkaline phosphatase, and activity against *S. lutea* after treatment with alkaline phosphatase. The presence of clindamycin after phosphatase treatment is shown by TLC (Thin-layer chromatography).

D. Separation of Clindamycin-3-Nucleotides by Chromatography

The clindamycin-3-nucleotides, obtained as described above, are separated into the individual clindamycin-3-nucleotides by use of DEAE - Sephadex Chromatography. The resin is prepared by slurrying 500 g. of DEAE - Sephadex (A-25) with water for about one hour. The resin is separated by filtration and stirred with 0.5 N aqueous sodium hydroxide solution for 2 hours. The resin is again isolated by filtration and washed with water until the pH of the wash is almost neutral. The washed resin is then stirred with 0.5 N aqueous acetic acid for 2 hours, and finally washed to a neutral pH.

The resin, prepared as described above, is added into a glass column and allowed to settle under atmospheric pressure. The column is washed with 4 l. of water and then with 4 l. of 0.1 percent aqueous solution of tris-(hydroxymethyl)-aminomethane (THAM).

The starting material (ADA-39.2, 13.0 g.) is dissolved in 100 ml. of water. The pH is adjusted to 9.0 with concentrated ammonium hydroxide. This solution is then added on the top of the column. The column is eluted sequentially as follows:

1. 15 l. of 0.05 M THAM acetate (prepared by dissolving 6.05 g. of THAM in 800 ml. of water, adjusting the pH to 8.0 with glacial acetic acid and then adjusting the volume to 1 l.).
2. 40 l. of 0.1 M THAM acetate buffer, pH 8.0.
3. 20 l. of 0.2 M THAM acetate buffer, pH 8.0.
4. 20 l. of 0.3 M THAM acetate buffer, pH 8.0.

Fractions of 20 ml. are collected. The following fractions are obtained from each buffer:

From 0.05 M buffer, fractions 1–722
From 0.1 M buffer, fractions 723–2920
From 0.2 M buffer, fractions 2921–3985
From 0.3 M buffer, fractions 2985–5000

Selected fractions are analyzed by testing for activity against *S. lutea* before and after alkaline phosphatase treatment and by U.V. spectra of the effluent of the column both as it is obtained and at acid pH (ca. 2.0).

The following pools are made:

Pool I

Fractions:
850–965
Volume:
ca. 2,300 ml.

| U.V.: | | λ max. (a) |
|---|---|---|
| | neutral, pH 7.0 | 270(3.72) |
| | acid, pH 2.0 | 279(5.40) |
| | base, pH 11.0 | 271(3.72) |

Pool II

Fractions:
1,240–1,535
Volume:
ca. 5,200 ml.

| U.V.: | | λ max. (a) |
|---|---|---|
| | neutral, pH 7.0 | 261(11.4) |
| | acid, pH 2.0 | 255(11.25) |
| | base, pH 11.0 | 258(11.25) |

Pool III

Fractions:
1,550–1,680
Volume:
2,600 ml.

| U.V.: | | λ max. (a) |
|---|---|---|
| | neutral, pH 7.0 | 262(3.60) |
| | acid, pH 2.0 | 262(3.64) |
| | base, pH 11.0 | 261(2.82) |

Pool IV

Fractions:
1,771–2,125
Volume:
7,000 ml.

| U.V.: | | λ max. (a) |
|---|---|---|
| | neutral, pH 7.0 | 254(3.74): sh 278 |
| | acid, pH 2.0 | 254(3.66): sh 278 |
| | base, pH 11.0 | 264(3.20) | a. Isolation of Clindamycin-3-(5'-Cytidylate Present In Pool I By Chromatography The column is prepared from 150 ml. of Amberlite XAD-2. Pool I, prepared as described above, is passed over the column at a rate of 6 ml./min. The spent is collected in 116 20-ml. fractions. All fractions show no U.V. maximum and are discarded. The column is then washed with 900 ml. of water (fractions 117–161). The wash is also discarded. The column is then eluted with 80 percent aqueous methanol. Fractions are analyzed by U.V. Results follow:

| Fraction No. | λ max. (a) |
|---|---|
| 162 | No U.V. maximum |
| 163 | No U.V. maximum |
| 164 | No U.V. maximum |
| 165 | No U.V. maximum |
| 166 | No U.V. maximum |
| 167 | 271 (9.9) |
| 168 | 271 (161.8) |
| 169 | 271 (168.0) |
| 170 | 271 (61.6) |
| 171 | 271 (19.4) |
| 172 | 271 (3.6) |
| 173 | 271 (1.0) |
| 174 | 271 (0.3) |
| 175 | 271 (0.15) |

Fractions 167–172 are combined. The solution is evaporated to an aqueous concentrate and freeze-dried; yield, 750 mg. of clindamycin-3-(5' cytidylate).

Five hundred mg. of this preparation is dissolved in 5 ml. of methanol and the solution is mixed with ether; yield, 400 mg. of clindamycin-3-(5'-cytidylate), having the following structure:

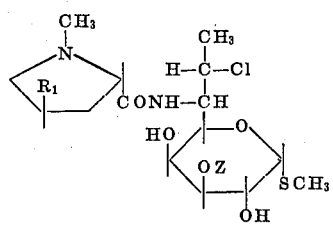

$R_1 = -CH_2CH_2CH_3$

II

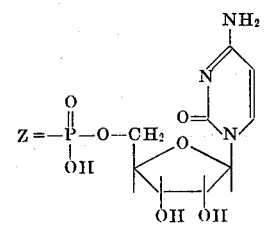

Analytical data
Calcd. for: $C_{27}H_{45}N_5O_{12}PSCl$:
C, 44.48; H, 6.17; N, 9.60; O, 26.39; S, 4.39; Cl, 4.87; P, 4.25.
Found:

C, 45.62; 45.86; H, 6.99; 7.63; N, 9.80; S, 3.61; Cl, 3.90; 4,04; P, 3.44.

Molecular weight
Calcd. for: $C_{27}H_{45}N_5O_{12}PSCl$: 729.5
Found:
742 (vapor pressure osmometry, in methanol).

Potentiometric titration
In water:    pKa' 7.7
             eq. wt. 587

Specific Rotation:
$[\alpha]_D^{25}$, +61° (c, 1, water)

Infrared Spectrum:
The infrared spectra in both mineral oil mull and KBr pellet are as follows:

IN MINERAL OIL MULL

| Band frequency (cm.⁻¹) | Intensity | Band frequency (cm.⁻¹) | Intensity | Band frequency (cm.⁻¹) | Intensity |
|---|---|---|---|---|---|
| 3,340 | S | 1,490 | S | 992 | S |
| 3,210 | S | ¹1,455 | S | 967 | M |
| 2,930¹ | S | ¹1,375 | S | 933 | M |
| 2,860¹ | S | ²1,365 | S | 886 | S |
| 2,730² | M | 1,282 | S | 853 | M |
| 1,717 | M | 1,215 | S | ²805 | M |
| 1,650 | S | 1,095 | S | 787 | S |
| 1,610² | S | 1,070 | S | ¹720 | S |
| 1,520 | S | 1,050 | S | | |

| | | In KBr Pellet | | | |
|---|---|---|---|---|---|
| 3,400 | S | ²1,530 | M | 1,045 | S |
| 3,210 | S | 1,520 | S | 990 | M |
| 3,100² | S | 1,490 | S | 965 | M |
| 2,955 | S | 1,455 | M | 930 | M |
| 2,925 | S | 1,395 | M | 882 | M |
| 2,870 | M | 1,380 | M | 850 | M |
| 2,790 | M | 1,286 | M | ²800 | M |
| 1,640 | S | 1,215 | S | 785 | M |
| 1,615 | S | 1,083 | S | 700 | M |
| 1,575² | M | 1,065 | S | | |

¹ Oil.
² Sh.

Band intensities in the I.R. spectra, disclosed herein, are indicated as S, M, and W, respectively, and are approximated in terms of the backgrounds in the vicinity of the bands. An S band is of the same order of intensity as the strongest in the spectrum; M bands are between one-third and two-thirds as intense as the strongest band, and W bands are less than one-third as intense as the strongest band. These estimates are made on the basis of a percent transmission scale. The designation "(sh)" refers to a "shoulder."

U.V.Spectrum: In water at the following pH's:

| | λ max. | a | ε |
|---|---|---|---|
| pH 2.0 | 279 | 13.16 | 9,600 |
| pH 7.0 | 269 | 9.37 | 6,835 |
| pH 11.0 | 271 | 9.10 | 6,638 |

Reactions with Enzymes

Crude Alkaline Phosphatase
Treatment with alkaline phosphatase yields clindamycin identified by thin-layer chromatography (silica gel, ethyl acetate-acetone-water (8:5:1 v/v)).

Venom Diesterase
Treatment with venom diesterase yields clindamycin identified by thin-layer chromatography (as above). In addition to clindamycin, cytidine-5'-phosphate is produced.

b. Isolation of Clindamycin-3-(5'-Adenylate) Pool II by Chromatography

The column is prepared from 400 ml. of Amberlite XAD-2. Pool II is passed over the column at a flow rate of 15 ml./min. The column is washed with 4 l. of water. Both spent and aqueous wash do not show U.V. maxima and are discarded. The column is eluted with 80 percent aqueous methanol. Fractions are analyzed by U.V. Results follow:

| Fraction No. | λ max. (a) |
|---|---|
| 5 | 260 No maximum |
| 10 | 260 (0.18) |
| 12 | 260 (0.46) |
| 14 | 260 (0.47) |
| 15 | 260 (230.0) |
| 16 | 260 (632) |
| 17 | 260 (628) |
| 18 | 260 (540) |
| 19 | 260 (405) |
| 20 | 260 (280) |
| 21 | 260 (230) |
| 22 | 260 (135) |
| 23 | 260 (80) |
| 24 | 260 (55) |
| 25 | 260 (31.5) |
| 26 | 260 (26.4) |
| 27 | 260 (12.8) |
| 28 | 260 (9.0) |
| 29 | 260 (5.5) |
| 30 | 260 (3.65) |
| 31 | 260 (2.60) |
| 32 | 260 (2.0) |
| 33 | 260 (1.55) |

Fractions 15–21 are combined. The solution is mixed with 1,500 ml. of acetone. The precipitated material is collected and dried; yield, 2.1 g. of clindamycin-3-(5'-adenylate) having the following structure:

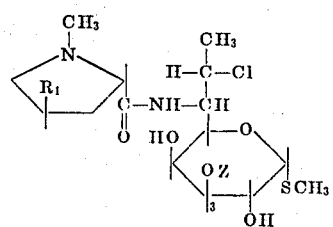
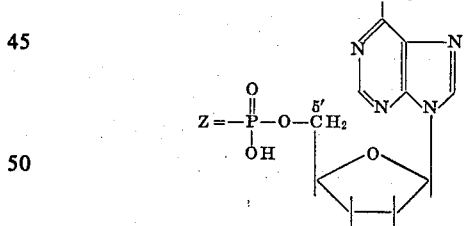

III

Clindamycin-3-(5'-adenylate) has the following chemical and physical properties:

Analytical data
Calcd. for: $C_{28}H_{45}N_7O_{11}PSCl$:
C, 44.63; H, 6.05; N, 13.07; S, 4.28; Cl, 4.72; P.4.11.
Found:
C, 44.77; H, 6.66; N, 12.57; S, 4.65; Cl, 4.38; P, 3.52.

Molecular weight
Calcd. for: $C_{28}H_{45}N_7O_{11}PSCl$: 753.5
Found:
726 (vapor pressure osmometry, in methanol)

Potentiometric titration
In water:    pKa' 7.6
             Eq. wt. 620

Specific rotation:
$[\alpha]_D^{25}$, +62.9° (c, 1.04, water)

Infrared spectrum:
The infrared spectra in both mineral oil mull and KBr pellet are as follows:

In Mineral Oil Mull

| Band frequency (cm.⁻¹) | Intensity | Band frequency (cm.⁻¹) | Intensity | Band frequency (cm.⁻¹) | Intensity |
|---|---|---|---|---|---|
| 3,300 | S | ¹ 1,470 | S | 1,065 | S |
| 3,240 | S | ² 1,450 | S | 1,050 | S |
| 2,940² | S | ¹ 1,445 | S | 987 | S |
| 2,920² | S | ¹ 1,435 | S | 965 | S |
| 2,845² | S | 1,417 | S | 927 | M |
| 1,680¹ | S | ² 1,373 | S | 885 | S |
| 1,653 | S | ¹ 1,363 | S | 853 | M |
| 1,635 | S | 1,327 | S | 817 | M |
| 1,595 | S | 1,298 | S | 795 | S |
| 1,570 | S | ¹ 1,245 | S | ² 717 | S |
| 1,510 | S | 1,215 | S | | |

In KBr pellet

| | | | | | |
|---|---|---|---|---|---|
| 3,340 | S | 1,637 | S | 1,313 | S |
| 3,270 | S | 1,593 | S | 1,085 | S |
| 3,220 | S | 1,570 | M | 1,065 | S |
| 2,950 | M | 1,510 | M | 1,045 | S |
| 2,920 | S | 1,470 | M | 986 | M |
| 2,865 | M | 1,453 | M | 927 | M |
| 1,682 | S | 1,415 | M | 885 | M |
| 1,675 | S | 1,375 | M | 852 | M |
| 1,660 | S | 1,325 | M | 815 | M |
| 1,650 | S | 1,295 | M | 795 | M |
| 1,645 | S | ¹ 1,245 | M | 717 | M |

¹ Sh. ² Oil.

U.V. Spectrum: In water at the following pH's:

| | λ max. | a | ε |
|---|---|---|---|
| pH 2.0 | 257 | 16.76 | 12,628 |
| pH 7.0 | 261 | 16.67 | 12,560 |
| pH 11.0 | 261 | 16.87 | 12,711 |

Reactions with Enzymes

Crude Alkaline Phosphatase

Treatment with alkaline phosphatase yields clindamycin identified by thin-layer chromatography (silica gel, ethyl acetate-acetone-water (8:5:1 v/v)).

Venom Diesterase

Treatment with venom diesterase yields clindamycin and adenosine-5'-phosphate.

In Vivo Activity

Clindamycin-3-(5'-adenylate) does not possess in vitro antibacterial activity against *S. lutea*. However, it is active in vivo (mice, S.Q., *S. aureus*) with a $CD_{50}$ of 30 mg./kg.

c. Isolation of Clindamycin-3-(5'-Uridylate) Present in Pool III by Chromatography The column is prepared from 150 ml. of Amberlite XAD-2. Pool III is passed over the column at a rate of 10 ml./min. The column is washed with 1 l. of water. Both the spent and the aqueous wash do not show U.V. maximum. The column is then eluted with 80 percent aqueous methanol. Fractions are analyzed by U.V. Results follow:

| Fraction No. | λ max. (a) |
|---|---|
| 2 | No maximum |
| 4 | 261 (0.25) |
| 5 | 261 (0.97) |
| 6 | 261 (107) |
| 7 | 261 (248) |
| 8 | 261 (75) |
| 9 | 261 (18) |
| 10 | 261 (2.5) |
| 11 | 261 (0.87) |

Fractions 6–9 are combined. The solution is concentrated to dryness. The residue is dissolved in methanol and this solution is mixed with ether to give a precipitate; yield, 740 mg. of clindamycin-3-(5'-uridylate) having the following structure:

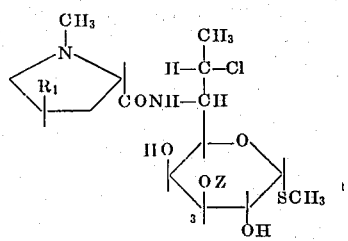

$R_1 = CH_2CH_2CH_3$

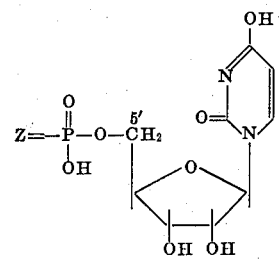

Clindamycin-3-(5'-uridylate) has the following chemical and physical properties:

Analytical data
  Calcd. for: $C_{27}H_{44}N_4O_{13}PSCl$;
  C, 44.27; H, 6.33; N, 7.68; O, 28.49; S, 4.39; Cl, 4.86; P, 4.24.
  Found:
  C, 44.62; H, 6.19; N, 7.79; S, 4.04; Cl, 4.32; P, 4.22.

Molecular weight
  Calcd. for: $C_{27}H_{44}N_4O_{13}PSCl$: 732.5
  Found: 764 (vapor pressure osmometry in methanol)

Potentiometric titration
  In water:   pKa', 7.6
             Eq. wt., 576

Specific Rotation
  $[\alpha]_D^{25}$, +79.5° (c, 0.99, water)

Infrared Spectrum

The infrared spectra in both mineral oil mull and KBr pellet are as follows:

IN MINERAL OIL MULL

| Band frequency (cm.⁻¹) | Intensity | Band frequency (cm.⁻¹) | Intensity | Band frequency (cm.⁻¹) | Intensity |
|---|---|---|---|---|---|
| 3,330 | S | ¹ 1,660 | S | 1,060 | S |
| 3,080 | S | 1,515 | S | 990 | S |
| 2,950² | S | 1,515 | S | 885 | S |
| 2,920² | S | ² 1,455 | S | 850 | S |
| 2,840² | S | ² 1,375 | S | 810 | S |
| 1,750¹ | M | 1,260 | S | 763 | S |
| 1,680 | S | 1,215 | S | ² 720 | S |

In KBr Pellet

| | | | | | |
|---|---|---|---|---|---|
| 3410 | S | 1,685 | S | 990 | M |
| 3260¹ | S | 1,512 | M | 965 | M |
| 3,100 | M | 1,458 | M | 883 | M |
| 2,960 | S | 1,380 | M | 850 | M |
| 2,920 | S | 1,260 | S | 808 | M |
| 2,865 | M | 1,215 | M | 760 | M |
| 2,800 | M | 1,085 | S | 705 | M |
| 1,700¹ | S | 1,060 | S | | |

¹ Sh. ² Oil.

U.V. Spectrum: In water at the following pH's:

| | λ max. | a | ε |
|---|---|---|---|
| pH 2.0 | 261 | 11.18 | 8,189 |
| pH 7.0 | 262 | 11.44 | 8,379 |
| pH 11.0 | 262 | 8.90 | 6,519 |

Reaction With Enzymes

Crude Alkaline Phosphatase

Treatment with alkaline phosphatase yields clindamycin identified by thin-layer chromatography (silica gel, ethyl acetate-acetone-water (8:5:1 v/v)).

Venom Diesterase

Treatment with venom diesterase yields clindamycin and uridine-5'-phosphate.

In Vivo Activity

Clindamycin-3-(5'-uridylate) does not possess antibacterial activity against *Sarcina lutea* in vitro. However, it is active in vivo (S.Q., mice, *S. aureus*) with a $CD_{50}$ of 37 mg./kg.

d. Isolation of Clindamycin-3-(5'-Guanylate) Present in Pool IV by Chromatography The column is prepared from 200 ml. of Amberlite XAD-2. Pool IV is passed over the column at a rate of 20 ml./min. The column is washed with 3 l. of water. Both spent and aqueous wash show no U.V. maximum. The column is eluted with 80 percent aqueous methanol. Fractions are analyzed by U.V. Results follow:

| Fraction No. | λ Max. (a) |
|---|---|
| 2 | No maximum |
| 4 | No maximum |
| 6 | 254 (0.56); sh* 278 |
| 7 | 254 (260); sh 278 |
| 8 | 254 (740); sh 278 |
| 9 | 254 (400); sh 278 |
| 10 | 254 (168); sh 278 |
| 11 | 254 (50); sh 278 |
| 12 | 254 (11.5); sh 278 |
| 13 | 254 (3.2); sh 278 |
| 14 | 254 (1.16); sh 278 |

*shoulder

Fractions 7–10 are combined. This solution is mixed with 1 l. of acetone to give a precipitate; yield, 1.2 g. of clindamycin-3-(5'-guanylate) having the following structure:

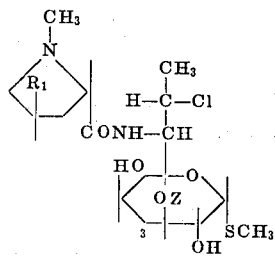

$R_1 = CH_2CH_2CH_3$

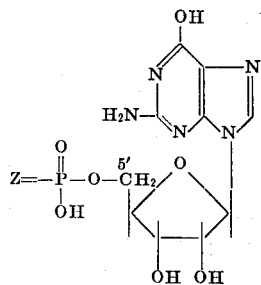

Clindamycin-3-(5'-guanylate) has the following chemical and physical properties:
Analytical Data
  Calcd. for: $C_{28}H_{45}N_7O_{12}PSCl$:
  C, 43.71; H, 5.85; N, 12.74; O, 25.00; S, 4.16; Cl, 4.61; P, 4.03.
  Found:
  C, 43.69; H, 6.34; N, 11.62; S, 3.63; Cl, 4.15; P, 3.81.
Molecular Weight
  Calcd. for: $C_{28}H_{45}N_7O_{12}PSCl$: 769.5
  Found:
  750 (vapor pressure osmometry in methanol)

Potentiometric Titration
  In water:  pKa', 7.6
             Eq. wt., 721

Specific Rotation
  $[\alpha]_D^{25}$, +69° (c, 1.0, water)
Infrared Spectrum
  The infrared spectra in both mineral oil mull and KBr pellet are as follows:

IN MINERAL OIL MULL

| Band frequency (cm.⁻¹) | Intensity | Band frequency (cm.⁻¹) | Intensity | Band frequency (cm.⁻¹) | Intensity |
|---|---|---|---|---|---|
| 3,330 | S | 1,530 | S | ¹1,050 | S |
| 3,220 | S | 1,457 | S | 987 | M |
| 2,920 ² | S | 1,409 | M | 963 | M |
| 2,845 ² | S | ²1,375 | S | 925 | M |
| 1,684 | S | 1,365 | S | 885 | S |
| 1,675 | S | 1,315 | M | 855 | M |
| 1,635 | S | ¹1,250 | S | 795 | M |
| 1,630 | S | 1,215 | S | 780 | M |
| 1,595 | S | ¹1,080 | S | ²717 | M |
| 1,565 | S | 1,065 | S | 680 | M |

In KBr Pellet

| | | | | | |
|---|---|---|---|---|---|
| 3,420 | S | 1,570 | S | 1,065 | S |
| 3,240 ¹ | S | 1,530 | M | 1,045 | S |
| 2,950 | S | 1,450 | M | 985 | M |
| 2,920 | S | 1,405 | M | 925 | M |
| 2,865 | S | 1,380 | M | 885 | M |
| 1,685 | S | 1,355 | M | 855 | M |
| 1,635 | S | ¹1,255 | M | 800 | M |
| 1,630 | S | 1,210 | S | 780 | M |
| 1,595 | S | 1,080 | S | | |

¹ Sh.   ² Oil.

U.V. Spectrum: In water at the following pH's:

| | λ Max. | a | ε |
|---|---|---|---|
| pH 1.0 | 256 | 14.49 | 11,150 |
| | 277 sh | 9.69 | 7,456 |
| pH 7.0 | 254 | 16.18 | 12,450 |
| | 273 sh | 11.21 | 8,626 |
| pH 11.0 | 259 | 13.95 | 10,734 |
| | 266 | 13.78 | 10,603 |

Reaction with Enzymes

Crude Alkaline phosphatase
  Treatment with alkaline phosphatase yields clindamycin identified by thin-layer chromatography (silica gel, ethyl acetate-acetone-water (8:5:1 v/v)).
Venom Diesterase
  Treatment with venom diesterase yields clindamycin and guanosine-5'-phosphate.

In Vivo Activity

Clindamycin-3-(5'-guanylate) does not possess antibacterial activity against Sarcina lutea in vitro. However, it is active in vivo (S.Q., mice, S. aureus) with a $CD_{50}$ of 26 mg./kg.

EXAMPLE 2

Upon substituting the microorganism Streptomyces venezuelae, NRRL 3527, for the microorganism S. coelicolor Müller, NRRL 3532, in Example 1, there are obtained the clindamycin-3-nucleotides disclosed in Example 1.

EXAMPLE 3

Upon substituting lincomycin for clindamycin in the fermentation medium of Example 1, there are obtained lincomycin-3-nucleotides wherein the nucleotide moieties are the same as disclosed in Example 1.

EXAMPLE 4

Upon substituting 1'-demethyl-clindamycin for clindamycin in the fermentation medium of Example 1, there are obtained 1'-demethyl-clindamycin-3-nucleotides wherein the nucleotide moieties are the same as disclosed in Example 1.

EXAMPLE 5

Upon substituting 1'-demethyl-4'-depropyl-4'-pentylclindamycin for clindamycin in the fermentation medium of Example 1, there are obtained 1'-demethyl-4'-depropyl-4'-pentyl-clindamycin-3-nucleotides wherein the nucleotide moieties are the same as disclosed in Example 1.

EXAMPLE 6

Upon substituting 4'-depropyl-4'-ethyl lincomycin for clindamycin in the fermentation medium of Example 1, there are obtained 4'-depropyl-4'-ethyl-lincomycin-3-nucleotides wherein the nucleotide moieties are the same as disclosed in Example 1.

EXAMPLE 7

Upon substituting 1'-demethyl-1'-ethyl lincomycin for clindamycin in the fermentation medium of Example 1, there are obtained 1'-demethyl-1'-ethyl lincomycin-3-nucleotides wherein the nucleotide moieties are the same as disclosed in Example 1.

EXAMPLE 8

Upon substituting 1'-demethyl lincomycin for clindamycin in the fermentation medium in Example 1, there are obtained 1'-demethyl lincomycin-3-nucleotides wherein the nucleotide moieties are the same as disclosed in Example 1.

EXAMPLE 9

Upon substituting celesticetin for clindamycin in the fermentation medium in Example 1, there are obtained celesticetin-3-nucleotides wherein the nucleotide moieties are the same as disclosed in Example 1.

In the following examples, as above, the nucleotide moieties of the compounds of the examples are the same as disclosed in Example 1, i.e., cytidylate, adenylate, uridylate and guanylate.

EXAMPLE 10 — LINCOMYCIN-3-NUCLEOTIDE-AMMONIUM SALT

A lincomycin-3-nucleotide in the zwitterionic form is dissolved in a minimum amount of water and diluted with an equal amount of ethanol. The solution is cooled in an ice-water bath and then saturated with ammonia gas. The solution is taken to dryness at 30° C. under high vacuum. The residue is dissolved in a minimum amount of methanol and diluted with 5 volumes of ether to precipitate lincomycin-3-nucleotide as the ammonium salt.

EXAMPLE 11

Aqueous Oral Drops

| | | |
|---|---|---|
| A lincomycin-3-nucleotide | 100 | gm. |
| Propyl paraben | 0.25 | gm. |
| Methyl paraben | 0.75 | gm. |
| Sorbic acid | 1.0 | gm. |
| Sodium hydroxide, 4 N aqueous q.s. to pH 7.5 | | |
| Water, deionized q.s. | 1000 | ml. |

EXAMPLE 12 — SYRUP

An aqueous oral preparation containing 400 mg. of a lincomycin-3-nucleotide in each 5 milliliters is prepared from the following ingredients:

| | | |
|---|---|---|
| A lincomycin-3-nucleotide | 800 | gm. |
| Methyl paraben, U.S.P. | 7.5 | gm. |
| Propyl paraben, U.S.P. | 2.5 | gm. |
| Sorbic acid | 10 | gm. |
| Saccharin sodium | 6.5 | gm. |
| Glycerin | 3000 | ml. |
| Tragacanth powder | 100 | gm. |
| Orange oil flavor | 10 | gm. |
| F.D. and C. orange dye | 7.5 | gm. |
| Sodium hydroxide, 4 N aqueous q.s. pH 7.5 | | |
| Deionized water q.s. | 10,000 | ml. |

In place of a lincomycin-3-nucleotide in Examples 11 and 12, there can be substituted a 7(S)-chloro-7-deoxylincomycin-3-nucleotide, as well as the water soluble salts of a 7(S)-chloro-7-deoxylincomycin-3-nucleotide, for example, the alkali metal salts including the ammonium salt.

The aqueous formulations of Examples 11 and 12 are particularly useful as pediatric preparations and can be administered orally in the same dosages as lincomycin.

EXAMPLE 13 — CAPSULES

One thousand two-piece hard gelatin capsules for oral use, each containing 350 mg. of a 1'-demethylclindamycin-3-nucleotide are prepared from the following types and amounts of materials:

| | |
|---|---|
| A 1'-demethylclindamycin-3-nucleotide | 350 gm. |
| Corn starch | 50 gm. |
| Talc | 25 gm. |
| Magnesium stearate | 2.5gm. |

The materials are thoroughly mixed and then encapsulated in the usual manner.

The foregoing capsules are useful for the systemic treatment of infection in adult humans by the oral administration of one capsule every 4 hours.

Using the procedure above, capsules are similarly prepared with a 1'-demethylclindamycin-3-nucleotide in 50, 125, 250 and 500 mg. amounts by substituting 50, 125, 250 and 500 gm. of a 1'-demethylclindamycin-3-nucleotide for the 350 gm. used above.

EXAMPLE 14 — TABLETS

One thousand tablets for oral use, each containing 500 mg. of a 1'-demethyl-4'-depropyl-4'-pentyl-clindamycin-3-nucleotide are prepared from the following types and amounts of materials:

| | |
|---|---|
| A 1'-demethyl-4'-depropyl-4'-pentylclindamycin-3-nucleotide | 500 gm. |
| Lactose | 50 gm. |
| Corn starch | 65 gm. |
| Magnesium stearate | 3 gm. |
| Light liquid petrolatum | 3 gm. |

The ingredients are thoroughly mixed and slugged. The slugs are broken down by forcing through a number 16 screen. The resulting granules are then compressed into tablets, each tablet containing 500 mg. of active material.

The foregoing tablets are useful for systemic treatment of infections in adult humans by oral administration of one tablet every 4 hours.

Using the above procedure, except for reducing the amount of active material to 200 gm., tablets containing 200 mg. of active material are prepared.

EXAMPLE 15 — PARENTERAL PREPARATION

A sterile aqueous preparation for intramuscular use, containing in 1 ml. 300 mg. of a celesticetin-3-nucleotide is prepared from the following types and amounts of materials:

| | |
|---|---|
| A celesticetin-3-nucleotide | 300 gm. |
| Benzyl alcohol | 9 gm. |
| Water for injection, q.s. | 1000 ml. |

The sterile drug is dispensed in the sterile benzyl alcohol-water vehicle and filled into vials and the vials sealed.

EXAMPLE 16 — ANIMAL FEED

One thousand gm. of a feed mix is prepared from the following types and amounts of ingredients:

| | |
|---|---|
| A 4'-depropyl-4'-ethyl lincomycin 3-nucleotide | 20 gm. |
| Soybean meal | 390 gm. |
| Fish meal | 400 gm. |
| Wheat germ oil | 50 gm. |
| Sorghum molasses | 140 gm. |

The ingredients are mixed together and pressed into pellets.

The composition can be fed to laboratory animals, i.e., rats, mice, guinea pigs, and rabbits for prophylaxis during shipping.

For larger animals the composition can be added to the animal's regular feed in an amount calculated to give the desired dose of active material.

EXAMPLE 17 — PARENTERAL PREPARATION

A sterile aqueous preparation for intramuscular use, containing in 1 ml. 300 mg. of a lincomycin-3-nucleotide is prepared from the following types and amounts of materials:

| | |
|---|---|
| A lincomycin-3-nucleotide | 300 gm. |
| Benzyl alcohol | 9 gm. |
| Water for injection, q.s. | 1000 ml. |

The sterile drug is dispensed in the sterile benzyl alcohol-water vehicle and filled into vials and the vials sealed.

EXAMPLE 18 — 7-DEOXY-7(S)-METHOXYLINCOMYCIN HYDROCHLORIDE

Part 18–A:
Methyl N-acetyl-7-deoxy-7(S)-methoxy-α-thiolincosaminide

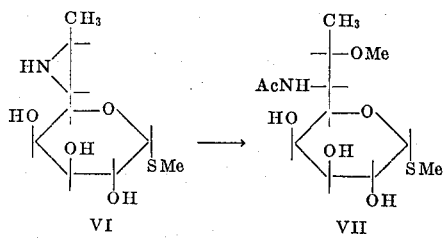

A suspension of 2.35 gms. of methyl 6,7-aziridino-6-deamino-7-deoxy-α-thiolincosaminide (VI) was maintained with stirring in 25 ccs. of methanol. To the suspension was then added 2.04 gms. of acetic anhydride. After stirring at room temperature for 1 hour the solvent was removed on a rotary evaporator at 40° C./7 mm. The resulting solids were then chromatographed on a 4.8 × 94 cm. column of silica gel using 1 MeOH:10 CHCl$_3$ as the solvent system. The weight of the silica was 750 gms. After a forerun of 1,000 ml., 50 ml. fractions were collected. Fractions 31–85 were combined, and evaporated to dryness yielding 3.2 gms. of methyl N-acetyl-7(S)-methoxy-7-deoxy-α-thiolincosaminide (VII) as a colorless amorphous solid, having the molecular weight by mass spectrometry of 309, compared with the calculated molecular weight of 309.38.

The starting aziridino compounds of Formula VI can be obtained by dehydrohalogenation of methyl 7(S)-chloro-7-deoxy-α-thiolincosaminide (Belgian Pat. No. 705,427, Apr. 22, 1968; U.S. application Ser. No. 692,727, filed Dec. 22, 1967). The dehydrohalogenation is effected with anhydrous sodium carbonate by heating at reflux in dimethylformamide (Belgian Pat. 732,352, Oct., 1969; U.S. application Ser. No. 725,531, filed Apr. 30, 1968).

Part 18–B:
Methyl 7-deoxy-7(S)-methoxy-α-thiolincosaminide (VIII) (Methyl 6,8-dideoxy-7-O-methyl-6-amino-1-thio-L-threo-α-D-galacto-octopyranoside)

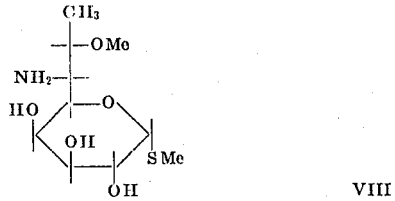

A solution of 3.2 gms. of methyl 7-deoxy-7(S)-methoxy-α-thiolincosaminide (VII) in 25 gms. of hydrazine hydrate was heated under gentle reflux with stirring in an oil-bath at 145° C. overnight. The solvent was removed from the colorless solution as completely as possible by distillation from an oil-bath at 100° C./15 mm. and finally at high vacuum to give methyl 7-deoxy-7(S)-methoxy-α-thiolincosaminide as a colorless syrup. The syrup was chromatographed on 750 gms. of silica gel in a 4.8 × 97 cm. column using 1 MeOH:10 CHCl$_3$ as the solvent system. After 1.4 liter forerun, 50 ml. fractions were collected. Fractions 281–600 were pooled and evaporated to dryness yielding 2.06 gms. methyl 7-deoxy-7(S)-methoxy-α-thiolincosaminide (VIII) which on crystallization from acetonitrile yielded colorless needles having the following characteristics:

m.p. 154°–155° C.
$[\alpha]_D$ +260° (c, 0.5634, H$_2$O)
Anal. Calcd. for C$_{10}$H$_{21}$O$_5$NS:
C, 44.92; H, 7.92; N, 5.24; S, 12.00; OMe, 11.61.
Found:
C, 45.20; H, 7.96; N, 5.08; S, 12.19; OMe, 11.86.
Mol. Wt. calcd.:
267.35
Found (mass spec.):
267

Part 18–C:
7-Deoxy-7(S)-methoxylincomycin hydrochloride

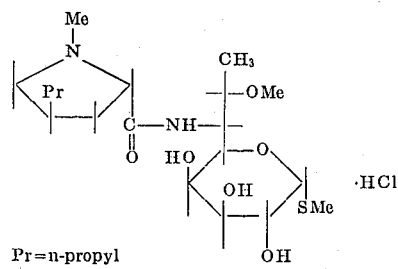

Pr = n-propyl

IX

To a suspension of 2.7 gms. of trans-1-methyl-4-propyl-L-2-pyrrolidinecarboxylic acid hydrochloride in 90 ccs. acetonitrile was added with stirring 2.89 gms. of triethylamine. The stirring was continued until all of the solid had dissolved; the reaction mixture was then cooled in an ice/methanol bath to −5° C., when a precipitate of triethylamine hydrochloride appeared. There was then added 1.78 gms. of isobutyl chloroformate dropwise keeping the temperature of the reaction at −5° to −3° C. Additional triethylamine hydrochloride precipitated and stirring was continued at −5° C. for 20 minutes. To the resulting reaction mixture was added 1.74 gms. of methyl 7-deoxy-7(S)-methoxy-α-thiolincosaminide (VIII), dissolved in 10 ccs. of water. As the solids dissolved, the temperature rose to about 0° C. and stirring was continued for 2 hours, without further icing the cooling bath. The solvent was then removed on a rotary evaporator at 40° C./15 mm. to a brown viscous residue. This was dissolved in dilute hydrochloric acid and the solution (pH 2) extracted twice with chloroform and the combined extracts washed once with water. The aqueous phase containing the wash water was adjusted to pH 11 with sodium hydroxide (50 percent aqueous solution), saturated with sodium chloride and extracted three times with chloroform. The combined chloroform extracts were dried over anhydrous sodium sulfate and taken to dryness yielding 1.76 gms. of a tan amorphous solid. The tan amorphous solid was chromatographed on 750 gms. of silica gel in a 4.8 × 94 cm. column using 1 MeOH:15 CHCl$_3$ as the solvent system. After 1.3 liters of forerun, 50 ml. fractions were collected. Fractions 60 through 80 were pooled and taken to dryness yielding 7-deoxy-7(S)-methoxylincomycin free base as an almost colorless syrup. This free base was taken up in dilute aqueous HCl and the resulting solution filtered and freeze-dried yielding 801.4 mg. of 7-deoxy-7(S)-methoxylincomycin hydrochloride as a colorless amorphous solid having the following characteristics:

$[\alpha]_D$ +117° (c, 0.9626, H$_2$O)
Anal. Calcd. for C$_{17}$H$_{26}$O$_6$N$_2$S·HCl:
C, 49.93; H, 8.16; N, 6.13; S, 7.02.
Found (corrected for 5.14 percent H$_2$O):
C, 49.44; H, 7.99; N, 6.20; S, 6.48.
Mol. Wt. Calcd. for anhydrous free base:
420.57
Found (Mass spec.):

420

The 7-deoxy-7(S)-methoxylincomycin thus produced can be subjected to the processes of the present invention to yield the corresponding novel 3-nucleotides of this invention.

EXAMPLE 19 — ALTERNATIVE METHOD FOR PRODUCING METHYL 7-DEOXY-7(S)-METHOXY-α-THIOLINCOSAMINIDE (VIII)

Part 19-A:
Methyl N-acetyl-6,7-aziridino-6-deamino-7-deoxy-2,3,4-tri-O-acetyl-α-thiolincosaminide (X)

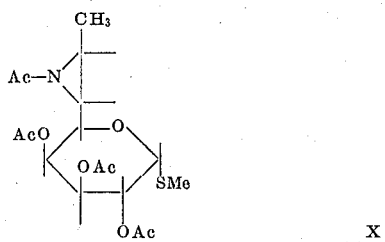

X

To a solution of 2.0 gms. of methyl 6,7-aziridino-6-deamino-7-deoxy-α thiolincosaminide (VI) in 20 ccs. of pyridine was added with stirring 10 ccs. of acetic anhydride and the reaction mixture left overnight at room temperature. The volatile material was removed as completely as possible from the reaction mixture on a rotary evaporator at 40° C./7mm., finally at high vacuum, to a colorless solid. The resulting solid was dissolved in chloroform, stirred with aqueous cadmium chloride to remove the pyridine, filtered and the chloroform layer washed twice with water, and dried over anhydrous sodium sulfate. On removal of the solvent on the rotary evaporator at 40° C./7 mm. methyl N-acetyl-6,7-aziridino-6-deamino-7-deoxy-2,3,4-tri-O-acetyl-α-thiolincosaminide (X) was obtained as a colorless crystalline solid, weight 3.1 gms. Recrystallization from ethyl acetate-Skellysolve B (technical hexane) gave colorless prismatic needles having the following characteristics:
m.p. 173.5°–175° C.
$[\alpha]_D$ +222° (c, 0.912, CHCl₃)
Anal. Calcd. for $C_{17}H_{25}O_8NS$:
C, 50.61; H, 6.25; N, 3.47; S, 7.95.
Found:
C, 50.43; H, 6.33; N, 3.41; S, 8.31.
Mol. Wt. calcd.:
403.45
Found (Mass spec.):
403

Part 19-B:
Methyl N-acetyl-2,3,4-tri-O-acetyl-7-deoxy-7(S)-methoxy-α-thiolincosaminide (XI)

A mixture of 5 gms. of methyl N-acetyl-2,3,4-O triacetyl-6,7-aziridino-6-deamino-7-deoxy-α thiolincosaminide (X), 50 ccs methanol, and 5 ccs. glacial acetic acid was heated under gentle reflux in an oil bath at 130° C. for 6 hours. The solvent was removed from the colorless solution at 40° C./7 mm. on a rotary evaporator yielding a pale yellow syrup which crystallized. The crystals were taken up in methylene chloride solution, washed with saturated aqueous sodium bicarbonate, then with water, and then dried over anhydrous sodium sulfate. Removal of the solvent as above gave methyl N-acetyl-2,3,4-tri-O-acetyl-7(S)-methoxy-7-deoxy-α-thiolincosaminide (XI) as colorless crystals (5.31 gms.). Crystallization from ethyl acetate-Skellysolve B gave fine colorless needles having the following properties:
m.p. 235°–236° C.
$[\alpha]_D$ +205° (c, 0.9952, CHCl₃)
Anal. Calcd. for $C_{19}H_{29}O_9NS$:
C, 49.64; H, 6.71; N, 3.22; s, 7.36; OMe, 7.13.
Found:
C, 49.77; H, 6.92; N, 3.65; S, 7.90; OMe, 7.38.
Mol. Wt. calcd.:
435.49
Found (Mass spec.):
435

On hydrazinolysis by the procedure of Part 18-B there is obtained methyl 7-deoxy-7(S)-methoxy-α-thiolincosaminide (VIII).

EXAMPLE 20 — MODIFICATION OF EXAMPLE 18

Part 20-A:
Methyl N acetyl-2,3,4-tri-O-acetyl-7-deoxy-7(S)-methoxy-α-thiolincosaminide (XI) and Methyl N-acetyl-2,3,-di-O-acetyl-7-deoxy-7(S)-methoxy-α-thiolincosaminide (XII)

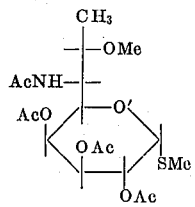 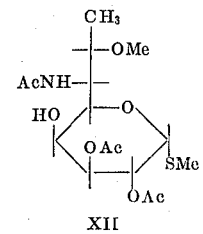

XI        XII

To 26.61 gms. of methyl N-acetyl-7-deoxy-7(S)-methoxy-α-thiolincosaminide (VII) in 100 ccs. of pyridine there was added 50 ccs. of acetic anhydride with stirring and the reaction mixture allowed to stand overnight at room temperature. The volatile materials were then removed by distillation on a rotary evaporator at 40° C./7 mm. and finally under high vacuum. The residue was dissolved in chloroform and washed with saturated aqueous sodium bicarbonate. The aqueous layer was washed with chloroform and the combined chloroform extracts stirred with aqueous cadmium chloride to remove the pyridine.

The precipitate was filtered off and washed well with chloroform and the chloroform layer separated, washed twice with water and dried over anhydrous sodium sulfate. On removal of the solvent on a rotary evaporator at 40° C./7 mm. a pale yellow syrup which crystallized on standing was obtained. On recrystallization from ethyl acetate-Skellysolve B, the produce was obtained as small colorless, flattened needles, and had the following characteristics:
m.p. 245°–247° C.
$[\alpha]_D$ +202° (c, 0.7142, CHCl₃)
Anal. Calcd. for $C_{18}H_{29}O_9NS$:
C, 49.64; H, 6.71; N, 3.22; S, 7.36; OMe, 7.13.
Found:
C, 49.24; H, 6.75; N, 3.34; S, 7.52; OMe, 7.17.
Mol. Wt. calcd.:
435.49
Found (Mass spec.):
435

The above material by Craig countercurrent distribution using as a solvent system 1 EtOH:1 H₂O:1 EtOAc:1 cyclohexane was shown to contain 70 percent of methyl N-acetyl-2,3,4-tri-O-acetyl-7-deoxy-7(S)-methoxy-α-thiolincosaminide (XI) and 30 percent of methyl N-acetyl-2,3-di-O-acetyl-7-deoxy-7(S)-methoxy-α-thiolincosaminide (XII). After 500 transfers, fractions from tubes 225–310 were pooled (K value 1.14) and evaporated to dryness and on recrystallization from ethyl acetate-Skellysolve B gave methyl N-acetyl-2,3,4-tri-O-acetyl-7-deoxy-7(S)-methoxy-α-thiolincosaminide (XI) as fine colorless needles, identical with the product of Part 19-B.

Fractions from tubes 115–220 (K value 0.59) were pooled and evaporated to dryness and on recrystallization from ethyl acetate-Skellysolve B gave methyl N-acetyl-2,3-di-O-acetyl-7-deoxy-7(S)-methoxy-α-thiolincosaminide (XII) as colorless chunky needles having the following characteristics:
m.p. 189°–190° C.
$[\alpha]_D$ +275° (c, 1.0188, CHCl₃)
Anal. Calcd. for $C_{16}H_{27}O_8NS$:
C, 48.84; H, 6.92; N, 3.56; S, 8.15; OMe, 7.89.
Found:
C, 48.71; H, 7.11; N, 3.93; S, 7.96; OMe, 7.98.
Mol. Wt. calcd.:
393.46
Found (Mass spec.):

393

Part 20-B:

Acetylation of methyl N-acetyl 2,3-di-O-acetyl-7-deoxy-7(S)-methoxy-α-thiolincosaminide (XII)

To a solution of 200 mg. of methyl N-acetyl-2,3-di-O-acetyl-7-deoxy-7(S)-methoxy-α-thiolincosaminide (XII) in 20 ccs. of pyridine was added 10 ccs. of acetic anhydride with stirring and the reaction mixture left at room temperature overnight. The solvent was removed from the colorless reaction solution on a rotating evaporator at 40° C./7 mm. finally at 40° C./high vacuum. The syrupy residue was dissolved in chloroform, washed with dilute aqueous HCl (one-half normal), twice with water, with saturated sodium bicarbonate solution and twice with water, and dried over anhydrous sodium sulfate. The solvent was then removed on a rotating evaporator at 40° C./7 mm. yielding methyl N-acetyl-2,3,4-tri-O-acetyl-7-deoxy-7(S)-methoxy-α-thiolincosaminide (XI) as a colorless syrup which crystallized on standing.

On hydrazinolysis of the products of Part 20-A and 20-B, there is obtained methyl 7-deoxy-7(S)-methoxy-α-thiolincosaminide (VIII).

EXAMPLE 21 — ALTERNATIVE FOR EXAMPLE 18

Part 21-A:

Methyl N-acetyl 6,7-aziridino-6-deamino-7-deoxy-α-thiolincosaminide (XIII)

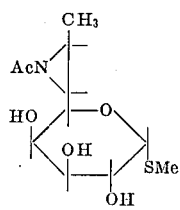

XIII

To a suspension of 2.3 gms. of methyl 6,7-aziridino-6-deamino-7-deoxy-α-thiolincosaminide (VI) in 25 ccs. isopropyl alcohol, there was added with stirring 2.04 gms. acetic anhydride. Most of the solid appeared to go into solution to be replaced by new solid. The reaction mixture was stirred overnight at room temperature, then filtered and the residue washed with isopropyl alcohol and dried in a vacuum oven at 60° C./15 mm. There was obtained 2.28 gms. of methyl N-acetyl-6,7-aziridino-6-deamino-7-deoxy-α-thiolincosaminide as colorless platelets having the following properties:

m.p. 145° C.
[α]$_D$ +235° (c, 0.7916, H$_2$O)
Anal. Calcd. for C$_{11}$H$_{19}$O$_5$NS:
C, 47.63; H, 6.91; N, 5.05; S, 11.56.
Found:
C, 47.57; H, 6.71; N, 5.23; S, 11.29.
Mol. Wt. calcd.:
277.34
Found (Mass spec.):
277

Part 21-B:

Methyl N-acetyl-7-deoxy-7(S)-methoxy-α-thiolincosaminide (VII)

On treating methyl N-acetyl 6,7-aziridino-6-deamino-7-deoxy-α-thiolincosaminide (XIII) with methanol and acetic acid under reflux, there is obtained methyl N-acetyl-7-deoxy-7(S)-methoxy-α-thiolincosaminide (VII) identical with the product of Part 18-A.

EXAMPLE 22 — 7-DEOXY-7(S)-ETHOXYLINCOMYCIN HYDROCHLORIDE

Part 22-A:

Methyl N-acetyl-7-deoxy-7(S)-ethoxy-α-thiolincosaminide (XIV)

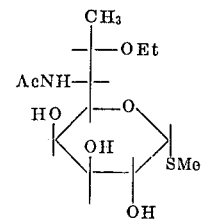

XIV

On treating the methyl N-acetyl-6,7-aziridino-6-deamino-7-deoxy-α-thiolincosaminide (XIII) with ethanol and acetic acid under gentle reflux, there is obtained methyl N-acetyl-7-deoxy-7(S)-ethoxy-1-thio-α-lincosaminide (XIV) as a syrup having the molecular weight by mass spec. of 323 compared with the calculated molecular weight of 323.41.

Part 22-B:

Methyl N-acetyl-2,3,4-tri-O-acetyl-7-deoxy-7(S)-ethoxy-α-thiolincosaminide (XV) and Methyl N-acetyl-7-deoxy-7(S)-ethoxy-2,3-di-O-acetyl-α-thiolincosaminide (XVI)

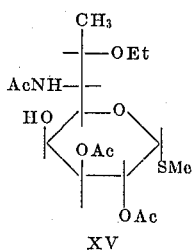 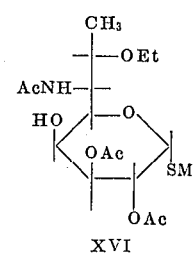

XV                    XVI

On treating the methyl N-acetyl-7-deoxy-7(S)-ethoxy-α-thiolincosaminide (XIV) with acetic anhydride and pyridine by the process of Part 20-A there is obtained methyl N-acetyl-2,3,4-tri-O-acetyl-7-deoxy-7(S)-O-ethyl-α-thiolincosaminide (XV) together with a minor amount of N-acetyl-2,3-di-O-acetyl-7-deoxy-7(S)-ethoxy-α-thiolincosaminide (XVI). The products (isolated on a Craig in 500 transfers using ethanol:water:ethyl acetate:cyclohexane (1:1:1:1) as the solvent system) are characterized as follows:

Mixture:
m.p. 197°–199° C.
[α]$_D$ +247° (c, 0.665, CHCl$_3$)
Anal. Calcd. for C$_{19}$H$_{31}$O$_9$NS:
C, 50.76; H, 6.95; N, 3.12; S, 7.13; OEt, 10.02.
Found:
C, 50.42; H, 7.07; N, 3.18; S, 7.37; OEt, 11.85.
Pure XV (K = 1.59): m.p. 254°–255° C.
[α]$_D$ +199° (c, 0.8638, CHCl$_3$)
Anal. Calcd. for C$_{19}$H$_{31}$O$_9$NS:
C, 50.76; H, 6.95; N, 3.12; S, 7.13; OEt, 10.02.
Found:
C, 50.75; H, 7.06; N, 3.37; S, 7.31; OEt, 10.25.
Mol. Wt. calcd.:
449.52
Found (Mass spec.):
449
Pure XVI (K = 0.87):
m.p. 215.5°–216.5° C.
[α]$_D$ +261° (c, 1.0448, CHCl$_3$)
Anal. Calcd. for C$_{17}$H$_{29}$O$_8$NS:
C, 50.11; H, 7.17; N, 3.44; S, 7.87.
Found:
C, 50.17; H, 7.30; N, 3.50; S, 7.62.
Mol. Wt. calcd.:
407.48
Found (Mass spec.):
407

Part 22-C:

Methyl 7-deoxy-7(S)-ethoxy-α-thiolincosaminide (XVII)

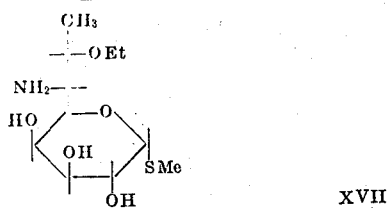

XVII

On subjecting the products of Part 22-B, that is, the mixture, the pure XV or the pure XVI to hydrazinolysis, there is obtained methyl 7-deoxy-7(S)-ethoxy-α-thiolincosaminide (XVII) having the following characteristics:
  m.p. 194°–196° C. $[\alpha]_D$ +252° (c, 0.7438, $H_2O$)
  Anal. Calcd. for $C_{11}H_{23}O_5NS$:
  C, 46.95; H, 8.24; N, 4.98; S, 11.40.
  Found:
  C, 46.66; H, 8.09; N, 5.26; S, 11.33.
  Mol. Wt. calcd.:
  281.37
  Found (Mass spec.):
  281

Part 22-D:
  7-Deoxy-7(S)-ethoxylincomycin hydrochloride (XVIII)

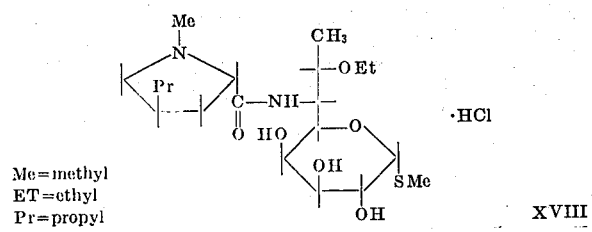

Me = methyl
ET = ethyl
Pr = propyl

XVIII

Following the procedure of Part 18-C, methyl 7-deoxy-7(S)-ethoxy-α-thiolincosaminide (XVII) is converted to 7-deoxy-7(S)-ethoxylincomycin hydrochloride having the following characteristics:
  m.p. colorless amorphous solid
  $[\alpha_D$ +109° (c, 0.9824, $H_2O$)
  Anal. Calcd. for $C_{20}H_{38}O_6N_2S \cdot HCl$:
  C, 50.99; H, 8.35; N, 5.95; Cl, 7.53; S, 6.81; OEt, 9.57.
  Found: (corrected for 5.07 percent water)
  C, 50.54; H, 8.19; N, 5.63; Cl, 7.61; S, 6.95; OEt, 10.16.

EXAMPLE 23

Part 23-A:
  Methyl N-acetyl-7-deoxy-7(S)-propoxy-α-thiolincosaminide (XIX), methyl N-acetyl-2,3,4-tri-O-acetyl-7-deoxy-7(S)-propoxy-α-thiolincosaminide (XX), and methyl N-acetyl-7-deoxy-7(S)-propoxy-2,3-di-O-acetyl-α-thiolincosaminide (XX( )

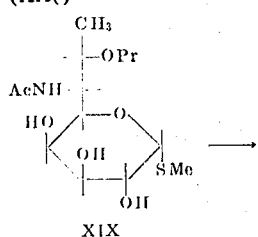

XIX

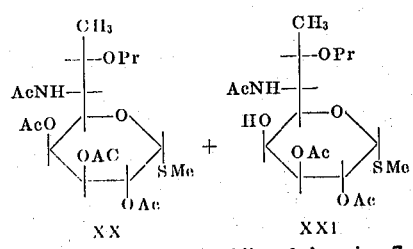

XX    XXI

On treating the methyl N-acetyl-6,7-aziridino-6-deamino-7-deoxy-α-thiolincosaminide (XIII) with propanol and acetic acid under gentle reflux, there is obtained methyl N-acetyl-7-deoxy-7(S)-propoxy-α-thiolincosaminide (XIX) from which on acetylation with acetic anhydride in pyridine by the procedure of Part 22-B, there is obtained methyl N-acetyl-2,3,4-tri-O-acetyl-7(S)-propoxy-7deoxy-α-thiolincosaminide (XX) containing a minor amount of methyl N-acetyl-2,3-di-O-acetyl-7(S)-propoxy-7-deoxy-α-thiolincosaminide (XXI) having the following characteristics:
Mixture:
  m.p. 240°–242° C.
  $[\alpha]_D$ +207° (c, 0.9054, $CHCl_3$)
  Anal. Calcd. for $C_{20}H_{33}O_9NS$:
  C, 51.81; H, 7.17; N, 3.03; S, 6.92.
  Found:
  C, 51.41; H, 7.33; N, 3.16; S, 6.92.
  Mol. Wt. calcd.:
  463.60
  Found (Mass spec.):
  463
Pure XX:
  m.p. 241.5°–242.5° C.
  $[\alpha]_D$ +193° (c, 0.9254 $CHCl_3$)
  Anal. Calcd. for $C_{20}H_{33}O_9NS$:
  C, 51.81; H, 7.17; N, 3.03; S, 6.92.
  Found:
  C, 51.77; H, 7.02; N, 3.37; S, 6.84.
  Mol. Wt. calcd.:
  463.60
  Found (Mass spec.):
  463

Part 23-B:
  Methyl 7-deoxy-7(S)-propoxy-α-thiolincosaminide (XXII)

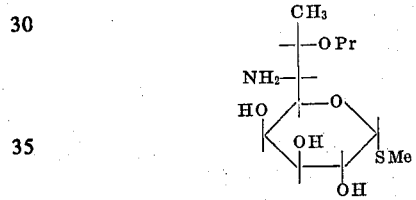

XXII

On hydrazinolysis of the above products )Part 23-A) there is obtained methyl 7-deoxy-7(S)-propoxy-α-thiolincosaminide (XXII).

Part 23-C:
  7-Deoxy-7(S)-propoxylincomycin hydrochloride (XXIII)

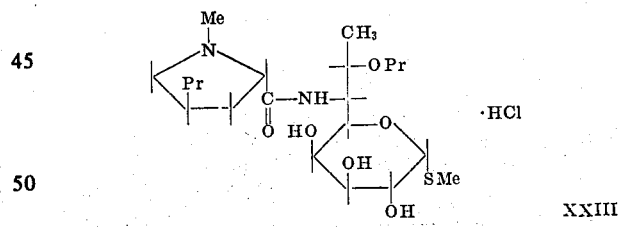

XXIII

On acylation with trans-1-methyl-4-propyl-L-2-pyrrolidine-carboxylic acid by the procedure of Part 18-C, there is obtained 7-deoxy-7(S)-propoxylincomycin hydrochloride (XXIII).

EXAMPLE 24

Part 24-A:
  Methyl N-acetyl-2,3,4-tri-O-acetyl-7-deoxy-7(S)-isopropoxy-α-thiolincosaminide (XXIV)

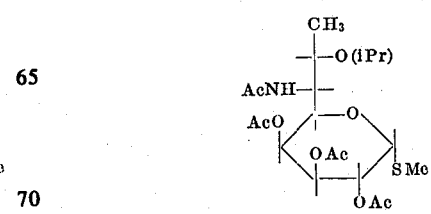

XXIV

Following the procedure of Part 19-B substituting the methanol by isopropyl alcohol, there is obtained methyl N-acetyl-2,3,4-tri-O-acetyl-7-deoxy-7(S)-isopropoxy-α-thiolincosaminide (XXIV) having the following characteristics:
  m.p. 253°–254° C.
  $[\alpha]_D$ +192° (c, 0.535, $CHCl_3$)
  Anal. Calcd. for $C_{20}H_{33}O_9NS$:

C, 51.81; H, 7.17; N, 3.03; S, 6.92.
Found:
C, 51.96; H, 7.07; N, 3.19; S, 6.61.
Mol. Wt. Calcd.:
463.6
Found (Mass spec.):
463

Part 24–B:
Methyl 7-deoxy-7-(S)-isopropoxy-α-thiolincosaminide (XXV)

On hydrazinolysis of compound XXIV (Part 24–A), there is obtained methyl 7-deoxy-7(S)-isopropoxy-α-thiolincosaminide having the following characteristics:
m.p. 213° C.
$[\alpha]_D$ +225° (c, 0.376, $H_2O$)
Anal. Calcd. for $C_{12}H_{25}O_5NS$:
C, 48.79; H, 8.53; N, 4.74; S, 10.86.
Found:
C, 48.52; H, 8.55; N, 5,26; S, 10.84.
Mol. Wt. Calcd.:
295.40
Found (Mass spec.):
295

Part 24–C:
7-Deoxy-7(S)-isopropoxylincomycin hydrochloride (XXVI)

Following the procedure of Part 18–C, compound XXVI (Part 24–C) is converted to 7-deoxy-7(S)-isopropoxylincomycin hydrochloride having the following characteristics:
m.p. amorphous
$[\alpha]_D$ +81° (c, 0.898, $H_2O$)
Anal. Calcd. for $C_{21}H_{40}O_6N_2S \cdot HCl$:
C, 51.99; H, 8.52; N, 5.78; S, 6.61; Cl, 7.31.
Found (corrected for 4.36 percent $H_2O$):
C, 51.72; H, 8.33; N, 5.59; S, 6.35; Cl, 7.29.
Mol. wt. calcd. (free base):
448.62
Found:
448
Activity:
about the same as lincomycin

EXAMPLE 25

Part 25–A:
Methyl N-acetyl-2,3,4-tri-O-acetyl-7-deoxy-7(S)-cyclohexyloxy-α-thiolincosaminide (XXVII)

Following the procedure of Part 19–B substituting the methanol by cyclohexanol, there is obtained methyl N-acetyl-2,3,4-tri-O-acetyl-7-deoxy-7(S)-cyclohexyloxy-α-thiolincosaminide (XXVII) having the following characteristics:
m.p. 266°–268° C.
$[\alpha]_D$ +163° (c, 1.055; $CHCl_3$)
Anal. Calcd. for $C_{23}H_{37}O_9NS$:
C, 54.85; H, 7.41; N, 2.78; S, 6.37.
Found:
C, 54.93; H, 7.53; N, 2.87; S, 6.65.
Mol. Wt. Calcd.:
503.61
Found (Mass spec.):
503

Part 25–B:
Methyl 7(S)-cyclohexyloxy-7-deoxy-α-thiolincosaminide (XXVIII)

On hydrazinolysis of compound XXVII (Part 25–A), there is obtained methyl 7(S)-cyclohexyloxy-7-deoxy-α-thiolincosaminide (XXVIII)

Part 25–C:
7(S)-cyclohexyl-7-deoxylincomycin hydrochloride

Following the procedure of Part 19–C, methyl 7(S)-cyclohexyloxy-7-deoxy-α-thiolincosaminide (XXVIII) is converted to 7(S)-cyclohexyloxy-7-deoxylincomycin hydrochloride.

EXAMPLE 26

Part 26–A:
Methyl N-acetyl-7-deoxy-7(S)-2'-hydroxyethoxy-α-thiolincosaminide (XXIX) and methyl N-acetyl-2,3,4-tri-O-acetyl-7(S)-2'-acetoxyethoxy-7-deoxy-α-thiolincosaminide (XXX)

Following the procedure of Part 18–A substituting the methanol by 2-hydroxy-ethanol, there is obtained methyl N-acetyl-7-deoxy-7(S)-2'-hydroxyethoxy-α-thiolincosaminide (XXIX) which when acylated by the procedure of Part 20–A but with heating on a steam bath to produce the fully acylated product gives methyl N-acetyl-2,3,4-tri-O-acetyl-7(S)-2'-acetoxyethoxy-7-deoxy-α-thiolincosaminide having the following characteristics:
m.p. 223°–225° C.
$[\alpha]_D$ +172° (c, 1.010, $CHCl_3$)

Anal. Calcd. for $C_{21}H_{33}O_{11}NS$:
C, 49.69; H, 6.55; N, 2.76; S, 6.32.
Found:
C, 49.56; H, 6.63; N, 2.90; S, 6.63.
Mol. Wt. calcd.:
507.55
Found:
507

Part 26–B:
Methyl 7-deoxy-7(S)-2'-hydroxyethoxy-α-thiolincosaminide (XXXI)

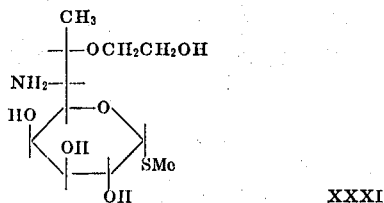

XXXI

On hydrazinolysis of methyl N-acetyl-2,3,4-tri-O-acetyl-7-deoxy-7(S)-2'-acetoxyethoxy-α-thiolincosaminide (XXXI), there is obtained methyl 7-deoxy-7(S)-2'-hydroxyethoxy-α-thiolincosaminide having the following characteristics:
m.p. 178.5°–179.5° C.
$[α]_D$ +243° (c, 0.662, $H_2O$)
Anal. Calcd. for $C_{11}H_{23}O_6NS$:
C, 44.43; H, 7.80; S, 10.78, N, 4.71.
Found:
C, 44.40; H, 7.99; S, 10.51 N, 4.60.
Mol. Wt. calcd.:
297.37
Found (Mass spec.):
297

Part 26–C:
Methyl 7-deoxy-7(S)-2'-hydroxyethoxylincomycin hydrochloride (XXXII)

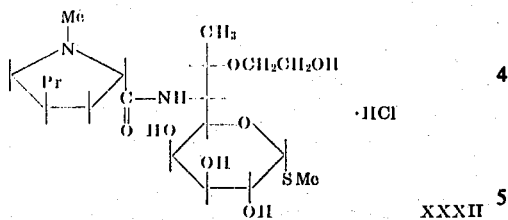

XXXII

Following the procedure of Part 18–C, methyl 7-deoxy-7(S)-2' hydroxyethoxy-α-thiolincosaminide (XXXI) is converted to 7-deoxy-7(S)-2'-hydroxyethoxylincomycin hydrochloride having the following characteristics:
m.p. amorphous
$[α]_D$ 105° (c, 1.102, $H_2O$)
Anal. Calcd. for $C_{20}H_{36}O_7N_2S·HCl$:
C, 49.32; H, 8.07; N, 5.75; S, 6.58; Cl, 7.28.
Found: (corrected for 2.11 percent $H_2O$)
C, 49.61; H, 7.85; N, 5.54; S, 6.46; Cl, 7.26.
Mol. wt. calcd. (free base):
450.59
Found (mass spec.):
450
Activity:
about one-third lincomycin

EXAMPLE 27

Part 27–A:
Methyl N-acetyl-7-deoxy-7(S)-2'-methoxyethoxy-α-thiolincosaminide (XXXIII) and methyl N-acetyl-2,3,4-tri-O-acetyl-7-deoxy-7(S)-2'-methoxyethoxy-α-triolincosaminide (XXXIV)

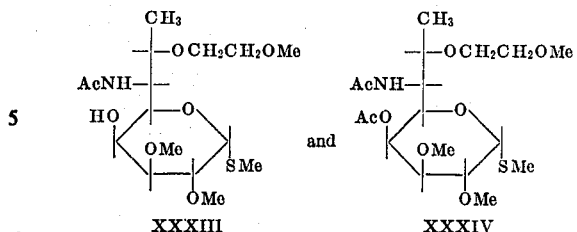

XXXIII and XXXIV

Following the procedure of Part 18–A but substituting the methanol by 2-methoxyethanol, there is obtained methyl N-acetyl-7-deoxy-7(S)-2'-methoxyethoxy-α-thiolincosaminide (XXXIII) which on acetylation by the procedure of Part 20–A but with heating on a steam bath to produce the fully acetylated product yields methyl N-acetyl-2,3,4-tri-O-acetyl-7-deoxy-7(S)-2'-methoxyethoxy-α-thiolincosaminide (XXXIV) which is characterized as follows:
m.p. 222°–223° C.
$[α]_D$ +177° (c, 1.079, $CHCl_3$)
Anal. Calcd. for $C_{20}H_{33}O_{10}NS$:
C, 50.09; H, 6.94; N, 2.92; S, 6.69; OMe, 6.47.
Found:
C, 50.13; H, 7.00; N, 2.77; S, 6.33; OMe, 7.28.
Mol. Wt. calcd.:
479.54
Found (Mass spec.):
479

Part 27–B:
Methyl 7-deoxy-7(S)-2'-methoxyethyl-α-thiolincosaminide (XXXV)

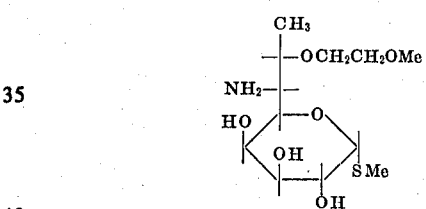

XXXV

On hydrazinolysis of methyl N-acetyl-2,3,4-tri-O-acetyl-7-deoxy-7(S)-2'-methoxyethoxy-α-thiolincosaminide (XXXIV), there is obtained methyl 7-deoxy-7(S)-2'-methoxyethoxy-α-thiolincosaminide (XXXV) having the following characteristics:
m.p. 178°–179° C.
$[α]_D$ +231° (c, 0.827, $H_2O$)
Anal. Calcd. for $C_{12}H_{25}O_6NS$:
C, 46.28; H, 8.09; N, 4.50; S, 10.30.
Found:
C, 46.57; H, 8.32; N, 5.01; S, 10.70.
Mol. Wt. Calcd.:
311.40
Found (Mass spec.):
311

Part 27–C:
Methyl 7-deoxy-7(S)-2'-methoxyethoxylincomycin hydrochloride (XXXVI)

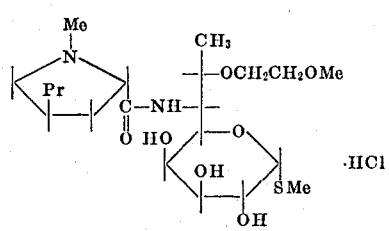

XXXVI

Following the procedure of Part 18–C, methyl 7-deoxy-7(S)-2'-methoxyethoxy-α-thiolincosaminide (XXXV) is converted to 7-deoxy-7(S)-2'-methoxyethoxylincomycin hydrochloride having the following characteristics:
m.p. amorphous
$[α]_D$ +87° (c, 0.575, $H_2O$)
Anal. Calcd. for $C_{21}H_{40}O_7N_2S·HCl$:
C, 50.33; H, 8.25; N, 5.59; S, 6.40; Cl, 7.08.
Found: (corrected for 4.17 percent $H_2O$)

C, 50.47; H, 8.60; N, 5.26; S, 5.86; Cl, 7.50.
Mol. wt. calcd. (free base):
464.62
Found (mass spec.):
464
Activity:
about one-third lincomycin EXAMPLE 28 — Methyl 7-Deoxy-7(S)-Hydroxy-α-Thiolincosaminide (XXXVII) (Methyl 6-Amino-6,8-Dideoxy-L-Threo-α-D-Galacto-Octopyranoside)

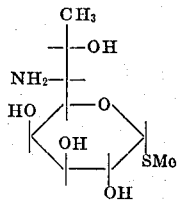

XXXVII

Part 28-A:
Methyl N-acetyl-7-deoxy-7(S)-hydroxy-α-thiolincosaminide (XXXVIII) (methyl 6-acetamido-6,8-dideoxy-L-threo-α-D-galacto-octopyranoside)

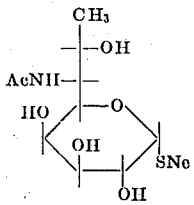

XXXVIII

To a solution of 2.35 gms. of methyl 6,7-aziridino-6-deamino-7-deoxy-α-thiolincosaminide (VI) in 25 ccs. of water was added 2.04 gms. of acetic anhydride and the solution left at room temperature overnight. The solution was then taken to dryness on a rotary evaporator at 40° C/7 mm. to give a colorless syrup which was chromatographed on 750 gms. of silica gel in a 4.8 × 98 cm. column using 1 MeOH:7 CHCl$_3$ as the solvent system. After a forerun of 550 ml., 50 ml. fractions were collected. Fractions 90 through 160 were pooled and taken to dryness to give 2.3 gms. of methyl N-acetyl 7-deoxy-7(S)-hydroxy-α-thiolincosaminide as a colorless solid which crystallized from methanol as colorless rods having the following characteristics:
m.p. 218°–219°C.
$[\alpha]_D$ +260° (c, 1.0296, H$_2$O)
Anal. Calcd. for C$_{11}$H$_{21}$O$_6$NS:
C, 44.73; H, 7.17; N, 4.74; S, 10.86.
Found:
C, 44.89; H, 7.02; N, 5.16; S, 10.64.
Mol. Wt. calcd.:
295.36
Found (Mass spec.):
295

Part 28-B:
Deacetylation
The crystallized material from Part 28-A was combined with the mother liquors and taken to dryness on a rotary evaporator at 40° C./7 mm. to give 2.01 gms. solid which was heated overnight under gentle reflux with 40 ccs. of hydrazine hydrate with stirring. The solvent was removed from the colorless solution on a rotary evaporator at 7 mm. pressure in an oil bath at 120° C. The resulting colorless crystalline residue on recrystallization from methanol gave methyl 7-deoxy-7(S)-hydroxy-α-thiolincosaminide (XXXVII) as colorless platelets having the following characteristics:
m.p. 211°–212°C.
$[\alpha]_D$ +280° (c, 0.7728, H$_2$O)
Anal. Calcd. for C$_9$H$_{19}$O$_5$NS:
C, 42.67; H, 7.56; N, 5.53; S, 12.66.

Found:
C, 42.81; H, 7.69; N, 5,85; S, 12.73.
Mol. Wt. calcd.:
253.32
Found (Mass spec.):
253

EXAMPLE 29 — Methyl N-Acetyl-2,3,4-Tri-O-Acetyl-7(S)-ethoxy-7-Deoxy-α-Thiolincosaminide (XV) and Methyl N-Acetyl-2,3,4-Tri-O-Acetyl-7(S)-Acetoxy-7-Deoxy-α-Thiolincosaminide (XXXIX)

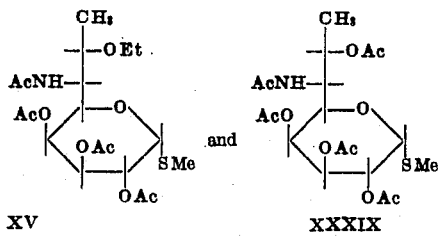

XV   XXXIX

Following the procedure of Part 19-B but substituting the methanol by ethanol, there is obtained methyl N-acetyl-2,3,4-tri-O-acetyl-7(S)-ethoxy-7-deoxy-α-thiolincosaminide (XV) identical with the product of Part 22-B and a minor amount of N-acetyl-2,3,4-tri-O-acetyl-7(S)-acetoxy-7-deoxy-α-thiolincosaminide (XXXIX) which can be separated by Craig countercurrent distribution using 1 EtOH:1 H$_2$O:1 EtOAc:1.5 cyclohexane as the solvent system in 500 transfers. The minor component (XXXIX) was obtained from tubes numbers 140–200 ($K$ = 0.52), and the major component (XV), from tubes numbers 260–330 ($K$ = 1.43). The minor component (XXXIX) crystallized from ethyl acetate as colorless needles having the following characteristics:
m.p. 312°–313°C.
$[\alpha]_D$ +182° (c, 0.5898, CHCl$_3$)
Anal. Calcd. for C$_{19}$H$_{29}$O$_{10}$NS:
C, 49.22; H, 6.31; N, 3.02; S, 6.92.
Found:
C, 49.17; H, 6.51; N, 3.08; S, 6,81.
Mol. Wt. calcd.:
463.50
Found (Mass spec.):
463

On subjecting the minor component to hydrazinolysis there is obtained methyl 7-deoxy-7(S)-hydroxy-α-thiolincosaminide (XXXVII) identical with the product of Part 28-B.

Example 30

Part 30-A:
2'-Hydroxyethyl N-acetyl-2',2,3,4-tetra-O-acetyl-7-O-methyl 1-thio-α-lincosaminide (XL)

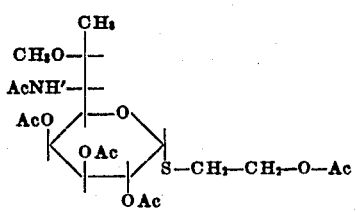

XL

2'-Hydroxyethyl 1-thio-α-celestosaminide (1.0 gm.) (Example 3 of U.S. Pat. No. 3,255,174) was left overnight in solution in pyridine (25 ccs.) and acetic anhydride (12 ccs.) Removal of the solvent in vacuo gave a colorless oil which was dissolved in chloroform, washed with water, dilute aqueous hydrochloric acid, water, saturated aqueous sodium bicarbonate, water and dried over anhydrous sodium sulfate. Solvent removal in vacuo gave a syrup (2.03 gms.) which on crystallization from ethyl acetate-Skellysolve B yielded 2'-hydroxyethyl N-acetyl-2',2,3,4-tetra-O-acetyl-7-O-methyl-1-thio-α-lincosaminide (Formula XL) in squat, colorless prisms, m.p. 143°–144° C. Skellysolve B is a brand of technical hexane.

Anal. Calcd. for $C_{21}H_{33}O_{11}NS$:
C, 49.68; H, 6.54; N, 2.76; S, 6.32 percent.
Found:
C, 49.66; H, 6.50; N, 2.91; S, 6.34 percent.
$[\alpha]_D$ +216° ($c$, 0.7746, $CHCl_3$)

Part 30–B:
Methyl N-acetyl-2,3,4-tri-O-acetyl-7-O-methyl-1-thio-$\alpha$- and -$\beta$-lincosaminides XLI and XLII)

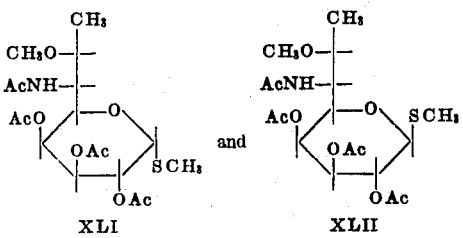

A solution of 5.05 gms. (1.62 ccs) of bromine in 100 ccs. of chloroform was added over approximately 30 minutes from a pressure-equalized dropping funnel under anhydrous conditions to a stirred solution of 10 gms. of 2'-hydroxyethyl N-acetyl-2',2,3,4-tetra-O-acetyl-1-thio-$\alpha$-celestosaminide prepared by the procedure of Part 30–A in 200 ccs. of chloroform. Initially, the bromine color disappeared immediately; later, a deep orange-red color developed. After stirring for an additional 30 minutes at room temperature, solvent was removed on a rotating evaporator at 40° C./7 mm., giving a yellow-orange syrupy residue. This was redissolved in chloroform, the solvent removed in vacuo, and the process repeated till the distillate became colorless, leaving a yellowish amorphous residue of 1-bromo-7-O-methyl-$\alpha$-lincosamine tetraacetate of the formula

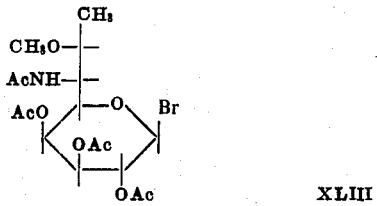

XLIII

The residue was dissolved in 200 ccs. of dry dimethylformamide, 4.5 gms. of thiourea was added, and the reaction mixture (a colorless solution) stirred overnight at room temperature. There were thus formed the isothiouronium salts of the formulas

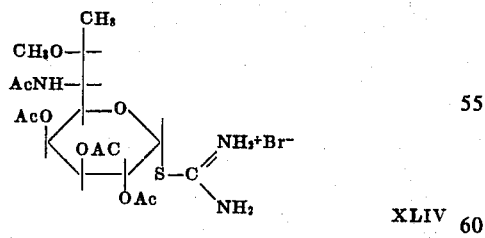

XLIV

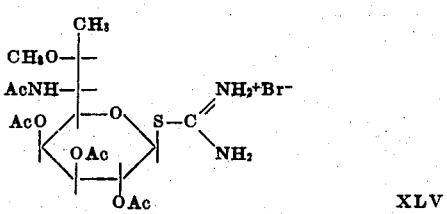

XLV

Without isolating these salts and after cooling in an ice-bath, 100 ccs. of water was added slowly, followed by 8.3 gms. of anhydrous potassium carbonate, 10.6 gms. of sodium bisulfite, and 28 gms. (12.3 ccs.) of methyl iodide. The mixture was stirred vigorously magnetically for 3 hours, the cooling bath being removed after 20 minutes.

Volatile materials were removed in vacuo at 40° C., and finally at 80° C./<1 mm. The yellow residue was dissolved in a mixture of chloroform and water, the aqueous layer extracted with chloroform, and the combined chloroform extracts were washed twice with water and dried over anhydrous sodium sulfate. Removal of the solvent in vacuo gave a colorless amorphous residue (6.48 gms.). Thin-layer chromatography (1 acetone:1 Skellysolve B) showed a major zone of product with a small zone of slightly higher $R_f$.

This material was chromatographed on silica gel (1.2 kilos, column dimensions 5.8 × 90 cms.) in the system 1 acetone:1.5 Skellysolve B. After a 500 cc. forerun, 50 fractions were collected automatically, and elution of materials followed by thin-layer chromatography. Fractions numbers 145–173, inclusive, corresponded to the material of higher $R_f$, numbers 185–310, inclusive, corresponded to the major product, and numbers 174–184, inclusive, were a mixture of the two.

Removal of solvent in vacuo from combined fractions 145–173, inclusive, gave a colorless syrup (570 mgms.), which on crystallization from ethyl acetate-Skellysolve B yielded methyl N-acetyl-2,3,4-tri-O-acetyl-7-O-methyl-1-thio-$\alpha$-lincosaminide in small colorless prisms, m.p. 212°–213° C. undepressed on a mixture with the sample of Example 31(Part 31 C), of m.p. 211°–213°, and also indistinguishable from it by infrared, nuclear magnetic resonance, and mass spectra, and also by optical rotation.

Removal of solvent in vacuo from combined fractions 185–310, inclusive, gave a slightly yellow amorphous solid (4.23 gms.), which on crystallization yielded methyl N-acetyl-2,3,4-tri-O-acetyl-7-O-methyl-1-thio-$\beta$-lincosaminide in colorless prisms, m.p. 187°–188°C.

Anal. Calcd. for $C_{18}H_{29}O_9NS$:
C, 49.64; H, 6.71; N, 3.22; S, 7.36; MeO, 7.13.
M.W. 435.49.
Found:
C, 49.73; H, 6.95; N, 3.18; S, 7.64; MeO, 7.41.
$[\alpha]_D$ +24° ($c$, 0.7484, $CHCl_3$)
Mol. Wt.:
(mass spec., $M^+$) 435

The overall yield of introduction of the —SMe group (i.e. $\alpha$ + $\beta$-anomers) was 49.2 percent (6.7 percent $\alpha$, 42.5 percent $\beta$) with the $\alpha/\beta$ ratio 1:6.35.

The $\beta$-anomer can be recycled to Part 30–B and thus enhance the overall yield of the more desired $\alpha$-anomer.

Part 30–C:
The procedure of Part 30–B was repeated substituting the methylformamide by hexamethylphosphoric triamide $(Me_2N)_3P$  O) giving an overall yield of 65.5 percent (22.7 percent $\alpha$, 42.8 percent $\beta$) and thus an $\alpha/\beta$ ratio of 1:1.9.

Part 30–D–1:
Methyl 7O-methyl-1-thio-$\alpha$-lincosaminide (XLVI)

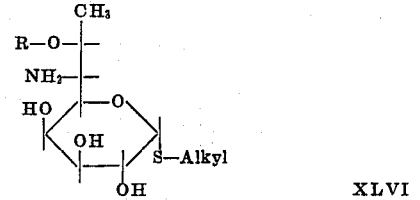

XLVI

The methyl 7-O-methyl-1-thio-$\alpha$-lincosaminide-tetraacetate (1.46 gms.) was dissolved in 50 ccs. of hydrazine hydrate and heated under gentle reflux in an oil-bath at 155° C. for 24 hours. Volatile solvent was then removed as completely as possible by distillation at 110° C./15 mm., giving a colorless crystalline residue which was triturated with anhydrous acetonitrile. The solid was removed by filtration and dried. On crystallization from a concentrate of 95 percent ethanol, 430 mgs. of methyl 7-O-methyl-1-thio-$\alpha$-lincosaminide hemihydrate (Polymorph I) were obtained as colorless flattened needles, m.p. 126°–126.5°C.

Anal. Calcd. for $C_{10}H_{21}O_6HS \cdot 1/2H_2O$:
C, 43.46; H, 8.03, N, 5.07; S, 11.60; OMe, 11.23; M.W. (anhydrous) 267.35.

Found:
C, 43.63; H, 8.30; N, 5.18; S, 11.67; OMe, 11.74.
pKa' 7.1
[α]$_D$ +263° (c, 0.8284, H$_2$O)
Mol. Wt.:
(mass spec., M$^+$) 267

Part 30–D–2:

The procedure of Part 30–D–1 was repeated except that the crystallization was effected slowly in a more dilute solution in 95 percent ethanol. Methyl 7-O-methyl--thio-α-lincosaminide hemihydrate was obtained as colorless platelets, m.p. 162°–163° C. (Polymorph II).

Both polymorphic forms showed identical chromatographic behavior (R$_f$ 0.2 on silica gel TLC in 1 methanol: 15 chloroform by volume). A mixture melting point of forms I and II gave the following:

| | |
|---|---|
| I and II | m.p. 126–126.5°C. |
| II and II | m.p. 162–163° C. |
| I and II | m.p. 162–163° C. |

Thus in the presence of Form II, Form I is converted to Form II at some temperature below 162° C.

Part 30–E: 7-O-Methyllincomycin hydrochloride (XLVII)

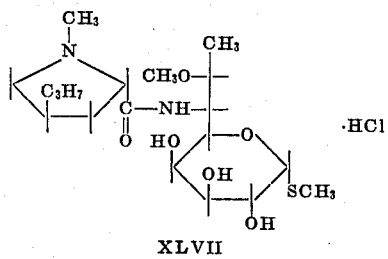

XLVII

A mixture of 3.08 gms. of 4-trans-propylhygric acid hydrochloride and 75 ccs. of acetonitrile was stirred magnetically in a three-necked, 500 cc. flask, equipped with a drying tube and a thermometer extending below the liquid surface. On addition of 3.31 gms. of triethylamine, the solid dissolved rapidly to give a pale tan solution.

On cooling to −5° C. in an ice/methanol bath, a colorless precipitate of triethylammonium chloride separated. Without removal of the precipitate, 2.02 gms. (1.94 ccs.) of isobutyl chloroformate were added at such a rate that the temperature remained between −5° and 8° C., after which stirring was continued at −5° C. for 15 minutes.

There were then rapidly added 2.0 gms. of methyl 7-O-methyl-1-thio-α-lincosaminide in 25 ccs. of water to the above mixed anhydride solution, giving a pale tan solution, which was stirred at 0° C. for 45 minutes. Thin-layer chromatography (silica gel, 8 ethyl acetate:5 acetone:1 water by volume) showed a trace only of residual aminosugar, and a major new zone of $R_f$ = 0.4. Volatile solvent was removed in vacuo at 40° C., the tan aqueous residual solution adjusted to pH 10 by the addition of aqueous sodium hydroxide (N), the mixture extracted thrice with 100 cc. portions of chloroform, and the combined extracts washed with water and dried over anhydrous sodium sulfate. Removal of the solvent in vacuo at 40° C. gives a tan amorphous solid (2.32 gms.).

Chromatography on silica gel (450 gms., column dimensions 3.8 × 95 cms.) in the system 1 methanol:15 chloroform by volume following a forerun (250 ccs.) after which 25 cc. fractions were collected automatically, gave 7-O-methyllincomycin in fractions 44–70, inclusive, obtained on removal of the solvent in vacuo as a colorless syrup (2.20 gms.). This syrup was dissolved in water (5 ccs.) by stirring and adding hydrochloric acid (concentrated) to attain a pH of 3, the solution filtered under suction, the sinter washed with water (3 ccs.) and the filtrate and washings cooled in an ice-methanol bath. With stirring, acetone (200 ccs.) was added, followed by ether (100 ccs.), giving a colorless crystalline precipitate which was collected and dried in a vacuum desiccator at room temperature. The solid (1.71 gms.) was obtained as small, elongated, colorless platelets, m.p. 155°–157° C.

Anal. Calcd. for C$_{19}$H$_{36}$O$_6$N$_2$S·HCl:
c, 49.93; H, 8.16; N, 6.13; S, 7.02; Cl, 7.76; OMe, 6.79
M.W. (free base) 420.57.
Found (corrected for 4.83 percent H$_2$O);
C, 50.09; H, 8.22; N, 6.02; S, 7.20; Cl, 7.46; OMe, 7.03
[α]$_D$ +145°C (c, 1.063, H$_2$O)
pKa' 7.6
Mol. Wt.:
(mass spec., M$^+$ of free base) 420

The 7(R)-O-methyllincomycin thus produced can be further processed by the novel process of this invention to yield the corresponding 3-nucleotide.

EXAMPLE 31

Part 31–A–1:

Methyl N-acetyl-2-O-acetyl-3,4-O isopropylidene-1-thio-α-lincosaminide (XLVIII)

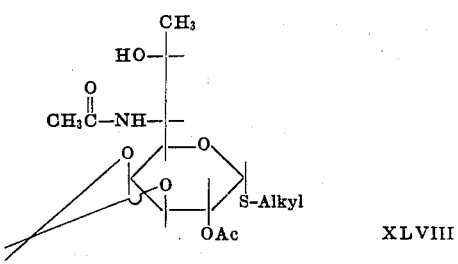

XLVIII

Methyl 6-N,7-O-ethylidyne-3,4-O-isopropylidene-1-thio-α-lincosaminide (5gms.) (Example 1–C of U.S. Pat. No. 3,337,527) was acetylated by leaving overnight at room temperature in a mixture of pyridine (25 ccs.) and acetic anhydride (12 ccs). Removal of solvent on a rotating evaporator in vacuo at 40° C. gave a pale yellow syrup which was dissolved in chloroform, washed with water, saturated aqueous sodium bicarbonate, again with water, and dried over anhydrous sodium sulfate. Thin-layer chromatography (silica gel, 75 methylethyl ketone;25 acetone:10 water by volume) showed the absence of starting material, and the formation of a new zone of slightly higher R$_f$. Removal of the solvent in vacuo at 40° C. gave methyl 2-O-acetyl-6N, 7-O-ethylidyne-3,4-O-isopropylidene-1-thio-α-lincosaminide as an almost colorless syrup which could not be induced to crystallize.

Water (75 ccs.) at pH 7 was added and, with magnetic stirring, the mixture was heated on a steam-bath. After 6 hours the solvent was removed in vacuo at 40° C. to give a colorless crystalline solid (5.95 gms.) which was chromatographed on silica (600 gms., column dimensions 4.8 × 79 cms.) in the system 1 methanol:7 chloroform (by volume). After a 650 cc. forerun, 25 cc. fractions were collected automatically, the elution being followed by thin-layer chromatography. The desired material was present in fractions 35–41, inclusive. Removal of the solvent gave a colorless amorphous solid (1.57 gms.). Recrystallization from acetone-Skellysolve B (technical hexane) gave colorless needles of methyl N-acetyl-2-O-acetyl-3,4-O-isopropylidine-1-thio-α-lincosaminide, m.p. 178°–179° C.

Anal. Calcd. for C$_{16}$H$_{27}$O$_7$NS:
C, 50.92; H, 7.21; N, 3.71; S, 8.49; N.W. 377.46.
Found:
C, 50.50; H, 7.20; N, 3.77; S, 8.50.
[α]$_D$ +194° (c, 0.7342, CHCl$_3$)
Mol. Wt.:
(mass spec. M$^+$) 377

Part 31–A–2:

The procedure of Part 31–A—1 was repeated except that the solvent was removed after a heating time of 2 hours (instead of 6 hours). The yield of methyl N-acetyl-2-O-acetyl-3,4-O-isopropylidene-1-thio-α-lincosaminide was increased to 60.5 percent.

Part 31–B:

Methyl N-acetyl-2-O-acetyl-7-O-methyl-3,4-O-isopropylidene-1-thio-α-lincosaminide (XLVIX)

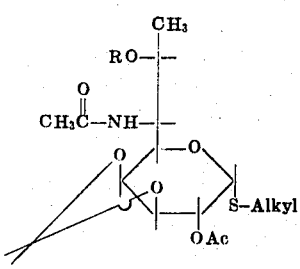

XLVIV

Methyl N-acetyl-2-O-acetyl-3,4-O-isopropylidene-1-thio-α-lincosaminide (1.0 gm., 1 mol.), methyl iodide (37.6 gms., 16.5 ccs., 100 mols.), and silver oxide (3.1 gms., 5 mols.) were heated and stirred under gentle reflux for 16 hours. The methyl iodide was removed in vacuo at 40° C., and the resulting yellow-gray powder was extracted thoroughly with methylene chloride. Removal of the solvent in vacuo gave a yellow syrup (1.09 gms.). This crude product was subjected to countercurrent distribution (500 transfers) in the system 1 ethyl acetate:1 ethanol:1 water:-2 cyclohexane, by volume, using equal volumes of upper and lower phase. A major peak was found, of $K = 0.34$, matching the theoretical curve.

Removal of the solvent from the combined fractions of the material of $K = 0.34$ yielded a syrup (250 mgms.) which crystallized on standing. Recrystallization from ethyl acetate-Skellysolve B, gave methyl N-acetyl-2-O-acetyl-7-O-methyl-3,4-O-isopropylidene-1-thio-α-lincosaminide as blunt, colorless needles m.p. 152°–154° C. (160 mgms.). A second recrystallization from the same solvent mixture yielded the pure product, m.p. 152.5°–154° C.

Anal. Calcd. for $C_{17}H_{29}O_7NS$:
C, 52.15; H, 7.47; N, 3.58; S, 8.19; N.W. 391.48.
Found:
C, 52.24; H, 7.48; N, 3.92; S, 7.98.
Mol. Wt.:
(mass spec., M$^+$) 391
$[\alpha]_D$ +188° (c, 1.185, CHCl$_3$)

Part 31-C:
Methyl N-acetyl-7-O-methyl-1-thio-α-lincosaminide and its triacetate

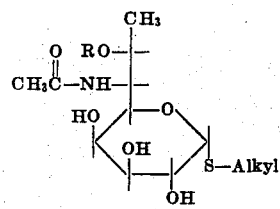

Methyl N-acetyl-2-O-acetyl-3,4-O-isopropylidene-1-thio-α-lincosaminide (100 mgms.) was stirred with water (20 ccs.) and aqueous hydrochloric acid (N, 5 ccs.) at room temperature overnight. The solution was neutralized by stirring with silver carbonate (3 gms.), the solids removed by filtration and washed with water, and the filtrate and washings taken to dryness on a rotating evaporator at 60°/7 mm., giving methyl N-acetyl-7-O-methyl-1-thio-α-lincosaminide as a colorless syrup which did not crystallize. It was further characterized by converting it to the triacetate.

Pyridine (5 ccs.) and acetic anhydride (3 ccs.) were added, the mixture swirled till the syrup had dissolved, and the mixture left overnight at room temperature. Solvent was then removed as completely as possible at 40° C./<1 mm., giving a tan crystalline mixture, which was dissolved in chloroform, washed with aqueous hydrochloric acid (N/10), water, saturated aqueous sodium bicarbonate, water, and dried over anhydrous sodium sulfate. Removal of the solvent in vacuo gave methyl N-acetyl-2,3,4-tri-O-acetyl-7-O-methyl-1-thio-α-lincosaminide as an almost colorless crystalline solid which separated from ethyl acetate-Skellysolve B in small colorless prisms, m.p. 211.5°–213° C.

Anal. Calcd. for $C_{18}H_{19}O_9NS$:
C, 49.64; H, 6.71; N, 3.22; S, 7.36; MeO, 7.13; N.W. 435.49.

Found:
C, 49.72; H, 6.77; N, 3.36; S, 7.27; MeO, 7.08.
$[\alpha]_D$ +229 (c, 0.7174, CHCl$_3$)
Mol. Wt.:
(mass spec., M$^+$) 435

In place of methyl iodide, there can be substituted ethyl, propyl, butyl, isobutyl, sec.butyl, and tert.butyl iodide to produce the corresponding 7-O-lower alkyl analogs.

In place of 4-propylhygric acid hydrochloride (1-methyl-4-trans-propyl-L 2-pyrrolidinecarboxylic acid hydrochloride) there can be substituted the hydrochlorides of other L-2-pyrolidine carboxylic acids of the formula

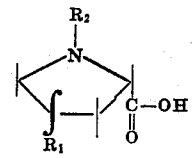

wherein R$_2$ is hydrogen or lower alkyl, for example, methyl and ethyl, and R$_1$ is hydrogen or lower alkyl, for example, methyl, ethyl, propyl, butyl, pentyl, hexyl, heptyl, and octyl, and the isomeric forms thereof, or lower cycloalkyl, for example, cyclopentyl, cyclohexyl, and cyclohexylmethyl to give compounds of the following formula

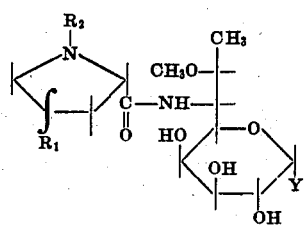

wherein R$_2$ and R$_1$ are as given above. The resulting lincomycin compounds can be converted to the corresponding novel 3-nucleotides by the novel processes of this invention.

We claim:
1. A compound of the formula:

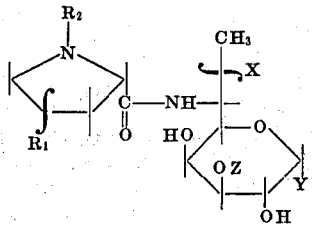

I.

and the pharmacologically acceptable salts thereof, wherein Y is —SR wherein R is alkyl of one to six carbon atoms, inclusive;

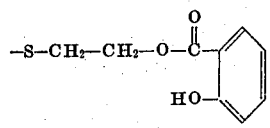

; —S—CH$_2$—CH$_2$—OH; or OR wherein R is alkyl of from one to eight carbon atoms, inclusive, and isomeric forms thereof; R$_1$ is H or cis or trans lower-alkyl of from one to eight carbon atoms; R$_2$ is H, CH$_3$ or C$_2$H$_5$; X is OH, chlorine, bromine, iodine or —OR$_3$, wherein R$_3$ is alkyl of one to six carbon atoms, inclusive, each in the (R) or (S) configuration; and Z is a nucleoside-5'-phosphate group wherein said nucleoside is adenosine, guanosine, cytidine or uridine.

2. The zwitterion form of the compound of claim 1.
3. A compound according to claim 1 having the formula:

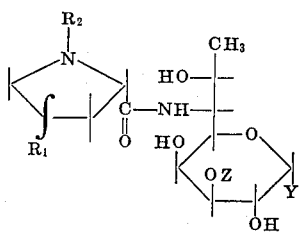

and the pharmacologically acceptable salts thereof, wherein Y, $R_1$ and $R_2$ are as given in claim 1, and Z is a nucleoside-5'-phosphate group wherein said nucleoside is adenosine, guanosine, cytidine or uridine.

4. A compound according to claim 3 having the formula:

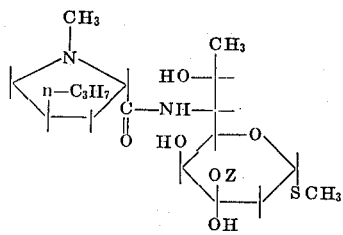

and the pharmacologically acceptable salts thereof, wherein Z is a nucleoside-5'-phosphate group wherein said nucleoside is adenosine, guanosine, cytidine or uridine.

5. A compound according to claim 3 having the formula:

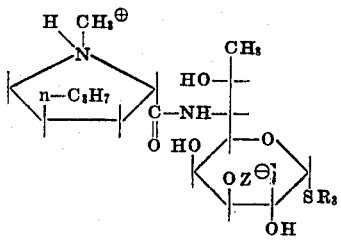

wherein Z is a nucleoside-5'-phosphate group wherein said nucleoside is adenosine, guanosine, cytidine or uridine and $R_3$ is $CH_3$.

6. A compound according to claim 1 having the formula:

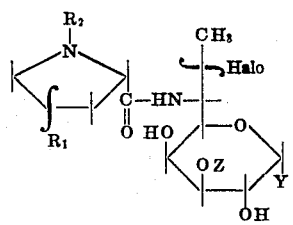

and the pharmacologically acceptable salts thereof, wherein halo is chlorine or bromine and Y, $R_1$, $R_2$ and Z are as given in claim 1.

7. A compound according to claim 6 having the formula:

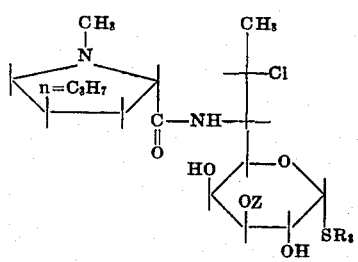

and the pharmacologically acceptable salts thereof, wherein Z is a nucleoside-5'-phosphate group wherein said nucleoside is adenosine, guanosine, cytidine or uridine and $R_3$ is $CH_3$.

8. A compound according to claim 6 having the formula:

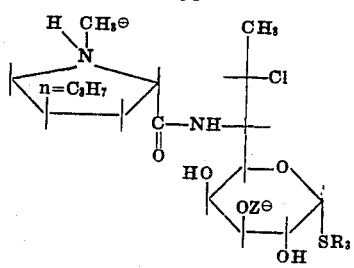

wherein Z is a nucleoside-5' phosphate group wherein said nucleoside is adenosine, guanosine, cytidine or uridine and $R_3$ is $CH_3$.

9. A compound according to claim 1 having the formula:

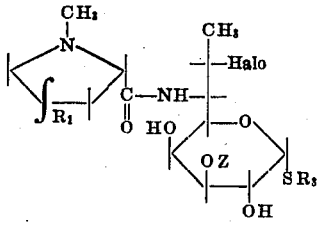

and pharmacologically acceptable salts thereof, wherein halo is chlorine or bromine; $R_3$ is $CH_3$; $R_1$ is pentyl; and Z is a nucleoside-5'-phosphate group wherein said nucleoside is adenosine, guanosine, cytidine or uridine.

10. A compound according to claim 9 having the formula:

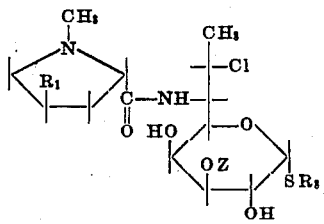

and pharmacologically acceptable salts thereof, wherein $R_3$ is $CH_3$; $R_1$ is pentyl; and Z is a nucleoside-5'-phosphate group wherein said nucleoside is adenosine, guanosine, cytidine or uridine.

11. A compound according to claim 9 having the formula:

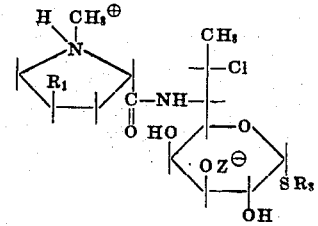

wherein Z is a nucleoside-5'-phosphate group wherein said nucleoside is adenosine, guanosine, cytidine or uridine; $R_3$ is $CH_3$; and $R_1$ is pentyl.

12. A compound according to claim 1 having the formula:

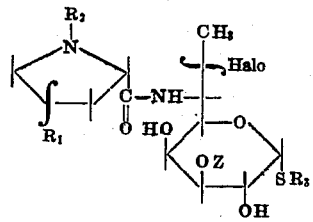

and pharmacologically acceptable salts thereof, wherein halo is chlorine or bromine; $R_3$ is $CH_3$; $R_1$ is pentyl; $R_2$ is H; and Z is a nucleoside-5'-phosphate group wherein said nucleoside is adenosine, guanosine, cytidine or uridine.

13. A compound according to claim 12 having the formula:

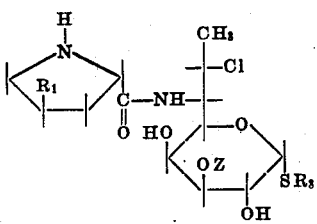

and pharmacologically acceptable salts thereof, wherein $R_3$ is $CH_3$; $R_1$ is pentyl; and Z is a nucleoside-5'-phosphate group wherein said nucleoside is adenosine, guanosine, cytidine or uridine.

14. A compound according to claim 12 having the formula:

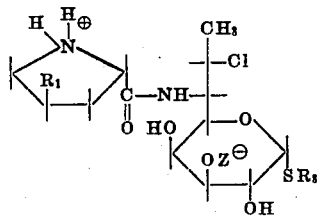

wherein $R_3$ is $CH_3$; $R_1$ is pentyl; and Z is a nucleoside-5'-phosphate group wherein said nucleoside is adenosine, guanosine, cytidine or uridine.

15. A compound according to claim 1 wherein Y is —$SCH_3$, $R_1$ is propyl, $R_2$ is $CH_3$, X is chlorine, and Z is a nucleoside-5'-phosphate group wherein said nucleoside is cytidine.

16. A compound according to claim 1 wherein Y is —$SCH_3$, $R_1$ is propyl, $R_2$ is $CH_3$, X is chlorine, and Z is a nucleoside-5'-phosphate group wherein said nucleoside is adenosine.

17. A compound according to claim 1 wherein Y is —$SCH_3$, $R_1$ is propyl, $R_2$ is $CH_3$, X is chlorine, and Z is a nucleoside-5'-phosphate group wherein said nucleoside is uridine.

18. A compound according to claim 1 wherein Y is —$SCH_3$, $R_1$ is propyl, $R_2$ is $CH_3$, X is chlorine, and Z is a nucleoside-5'-phosphate group wherein said nucleoside is guanosine.

19. A process for isolating a compound of the formula:

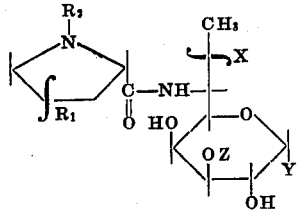

wherein $R_1$, $R_2$, Z, X and Y are as defined in claim 1, from a Streptomyces fermentation medium which comprises
1. filtering the fermentation medium;
2. absorbing the resulting filtrate on a suitable absorbent to remove water-soluble impurities;
3. chromatographing the resulting eluate from the absorbent on an anion exchange resin;
4. subjecting fractions from the anion exchange resin to counter current distribution; and
5. separating the individual 3-nucleotides by chromatography.

* * * * *